"" "" ""

United States Patent
Huh et al.

(12) United States Patent
(10) Patent No.: US 11,019,189 B2
(45) Date of Patent: May 25, 2021

(54) USER TERMINAL APPARATUS

(71) Applicant: SAMSUNG ELECTRONICS CO., LTD., Suwon-si (KR)

(72) Inventors: Jae-young Huh, Seoul (KR); Yu-dong Bae, Suwon-si (KR); Shi-yun Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/600,109

(22) Filed: Oct. 11, 2019

(65) Prior Publication Data
US 2020/0045154 A1 Feb. 6, 2020

Related U.S. Application Data

(63) Continuation of application No. 15/822,535, filed on Nov. 27, 2017, now Pat. No. 10,447,830, which is a
(Continued)

(30) Foreign Application Priority Data

Jan. 30, 2015 (KR) .................. 10-2015-0014701
Apr. 10, 2015 (KR) .................. 10-2015-0050718

(51) Int. Cl.
*H04R 1/02* (2006.01)
*H04M 1/02* (2006.01)
(Continued)

(52) U.S. Cl.
CPC ........ *H04M 1/0268* (2013.01); *H04B 1/3888* (2013.01); *H04R 1/025* (2013.01);
(Continued)

(58) Field of Classification Search
CPC .......... H04R 1/02; H04R 1/025; H04R 1/323; H04R 5/02; H04R 2400/03; H04R 2499/11; H04R 2499/15; H04M 1/0268
(Continued)

(56) References Cited

U.S. PATENT DOCUMENTS 4,979,554 A 12/1990 Nelson
5,790,679 A 8/1998 Hawker et al.
(Continued)

FOREIGN PATENT DOCUMENTS

CN 101146372 A 3/2008
CN 101788850 A 7/2010
(Continued)

OTHER PUBLICATIONS

Communication dated Jan. 28, 2020, issued by the Korean Intellectual Property Office in corresponding Korean Application No. 10-2015-0050718.
(Continued)

*Primary Examiner* — Huyen D Le
(74) *Attorney, Agent, or Firm* — Sughrue Mion, PLLC

(57) ABSTRACT

A user terminal apparatus is provided. The user terminal apparatus includes: a flexible display including: a main area; and a sub area comprising a curved portion and extending from the main area to a side portion of the user terminal apparatus; a housing configured to enclose the flexible display; a sound output hole provided between the flexible display and the housing and configured to output a sound from a call function; and a sound input hole configured to receive an input sound.

11 Claims, 26 Drawing Sheets

Related U.S. Application Data continuation of application No. 15/373,843, filed on Dec. 9, 2016, now Pat. No. 9,843,658, which is a continuation of application No. 14/826,317, filed on Aug. 14, 2015, now Pat. No. 9,537,527.

(60) Provisional application No. 62/097,223, filed on Dec. 29, 2014.

(51) Int. Cl.

| | | |
|---|---|---|
| *H04B 1/3888* | (2015.01) | |
| *H04R 1/32* | (2006.01) | |
| *H04R 1/34* | (2006.01) | |
| *H04R 5/02* | (2006.01) | |
| *H04R 1/30* | (2006.01) | |

(52) U.S. Cl.
CPC ............ *H04R 1/323* (2013.01); *H04R 1/345* (2013.01); *H04R 5/02* (2013.01); *H04M 2201/38* (2013.01); *H04R 1/30* (2013.01); *H04R 2201/34* (2013.01); *H04R 2400/01* (2013.01); *H04R 2400/03* (2013.01); *H04R 2460/13* (2013.01); *H04R 2499/11* (2013.01); *H04R 2499/15* (2013.01)

(58) Field of Classification Search
USPC ....... 381/306, 333, 334, 336, 182, 386, 388; 379/420.02, 430, 433.02, 432
See application file for complete search history.

(56) References Cited

U.S. PATENT DOCUMENTS

| | | | |
|---|---|---|---|
| 6,963,647 | B1 | 11/2005 | Krueger et al. |
| 7,050,600 | B2 | 5/2006 | Saiki et al. |
| 7,092,745 | B1 | 8/2006 | D'Souza |
| 7,120,264 | B2 | 10/2006 | Saiki et al. |
| 7,233,678 | B2 | 6/2007 | Erixon et al. |
| 7,576,983 | B2 | 8/2009 | Yamaguchi et al. |
| 7,746,627 | B2 | 6/2010 | Yamaguchi et al. |
| 8,098,868 | B2 | 1/2012 | Kim et al. |
| 8,483,422 | B2 | 7/2013 | Welker et al. |
| 8,723,824 | B2 | 5/2014 | Myers et al. |
| 8,886,263 | B2 | 11/2014 | Hosoi et al. |
| 9,261,995 | B2 | 2/2016 | Kimn |
| 9,299,314 | B2 | 3/2016 | Lee et al. |
| 9,392,097 | B2 | 7/2016 | Hosoi et al. |
| 9,537,527 | B2 | 1/2017 | Huh et al. |
| 9,684,342 | B2 | 6/2017 | Kim et al. |
| 9,843,658 | B2 | 12/2017 | Huh et al. |
| 9,864,567 | B2 | 1/2018 | Seo |
| 9,894,430 | B2 | 2/2018 | Hosoi et al. |
| 10,447,830 | B2 * | 10/2019 | Huh .................. H04R 5/02 |
| 10,779,075 | B2 | 9/2020 | Hosoi et al. |
| 2008/0062633 | A1 | 3/2008 | Yamaguchi et al. |
| 2008/0069384 | A1 | 3/2008 | Kim et al. |
| 2008/0186415 | A1 | 8/2008 | Boud et al. |
| 2009/0262491 | A1 | 10/2009 | Yamaguchi et al. |
| 2009/0280860 | A1 * | 11/2009 | Dahlke ................. G06F 3/0346 455/556.1 |
| 2010/0182265 | A1 | 7/2010 | Kim et al. |
| 2011/0065479 | A1 | 3/2011 | Nadar |
| 2012/0289162 | A1 | 11/2012 | Hosoi et al. |
| 2013/0076649 | A1 | 3/2013 | Myers et al. |
| 2013/0169545 | A1 | 7/2013 | Eaton et al. |
| 2013/0178248 | A1 | 7/2013 | Kim |
| 2013/0222271 | A1 | 8/2013 | Alberth et al. |
| 2013/0278873 | A1 | 10/2013 | Enomoto |
| 2013/0300697 | A1 | 11/2013 | Kim et al. |
| 2013/0321264 | A1 | 12/2013 | Park et al. |
| 2013/0321434 | A1 | 12/2013 | Ko et al. |
| 2014/0079231 | A1 | 3/2014 | Ye et al. |
| 2014/0079269 | A1 | 3/2014 | Choi |
| 2014/0092356 | A1 | 4/2014 | Ahn et al. |
| 2014/0118271 | A1 | 5/2014 | Lee et al. |
| 2014/0132481 | A1 | 5/2014 | Bell et al. |
| 2014/0157125 | A1 | 6/2014 | Seo |
| 2014/0218321 | A1 | 8/2014 | Lee et al. |
| 2014/0226275 | A1 | 8/2014 | Ko et al. |
| 2014/0240289 | A1 | 8/2014 | Myers et al. |
| 2014/0247252 | A1 | 9/2014 | Lee |
| 2014/0267097 | A1 | 9/2014 | Lee et al. |
| 2014/0268623 | A1 | 9/2014 | Kim et al. |
| 2014/0362003 | A1 | 12/2014 | Kimn |
| 2015/0065057 | A1 | 3/2015 | Hosoi et al. |
| 2015/0131836 | A1 | 5/2015 | Hoshikawa |
| 2015/0242006 | A1 | 8/2015 | Kim et al. |
| 2015/0301738 | A1 | 10/2015 | Nishigaki |
| 2016/0111028 | A1 * | 4/2016 | Lee ........................ G09F 27/00 361/679.01 |
| 2016/0286296 | A1 | 9/2016 | Hosoi et al. |
| 2018/0199127 | A1 | 7/2018 | Hosoi et al. |

FOREIGN PATENT DOCUMENTS

| | | |
|---|---|---|
| CN | 102473023 A | 5/2012 |
| CN | 102959930 A | 3/2013 |
| CN | 103416043 A | 11/2013 |
| CN | 103828334 A | 5/2014 |
| CN | 103853521 A | 6/2014 |
| CN | 103946780 A | 7/2014 |
| CN | 203691467 U | 7/2014 |
| CN | 104205871 A | 12/2014 |
| CN | 104238807 A | 12/2014 |
| EP | 2 725 474 A2 | 4/2014 |
| JP | 2014-99764 A | 5/2014 |
| KR | 10-2008-0025558 A | 3/2008 |
| KR | 10-2013-0104764 A | 9/2013 |
| KR | 10-2013-0127050 A | 11/2013 |
| KR | 10-2014-0036595 A | 3/2014 |
| KR | 10-2014-0040975 A | 4/2014 |
| KR | 10-2014-0054746 A | 5/2014 |
| KR | 10-2014-0101274 A | 8/2014 |
| WO | 2011/001014 A1 | 1/2011 |
| WO | 2012129247 A2 | 9/2012 |
| WO | 2013048881 A1 | 4/2013 |
| WO | 2013/077537 A1 | 5/2013 |
| WO | 2014175513 A1 | 10/2014 |

OTHER PUBLICATIONS

Communication dated Nov. 21, 2019, from the State Intellectual Property Office of People's Republic of China in counterpart Application No. 201580070270.2.
Communication dated Mar. 26, 2019, issued by the United States Patent and Trademark Office in counterpart U.S. Appl. No. 15/864,354.
Communication dated May 30, 2019, issued by the Chinese Patent Office in counterpart Chinese Application No. 201580071720.X.
Communication dated Apr. 15, 2016 issued by the International Searching Authority in counterpart International Application No. PCT/KR2015/014346 (PSA/IS/210 & PCT/ISA/237).
Communication dated Apr. 29, 2016 issued by the European Patent Office in counterpart European Patent Application No. 15196816.1.
Communication dated May 24, 2016 issued by the International Searching Authority in counterpart International Application No. PCT/KR2015/014342 (PCT/IS/210 & PCT/ISA/237).
Communication from United States Patent and Trademark Office dated Mar. 30, 2017, in U.S. Appl. No. 14/953,670.
Communication dated Oct. 27, 2020, issued by the State Intellectual Property Office of P.R. China in Chinese Application No. 201580070270.2.

* cited by examiner

USER TERMINAL APPARATUS

CROSS-REFERENCE TO RELATED APPLICATIONS

This application is a continuation application of U.S. application Ser. No. 15/822,535, filed on Nov. 27, 2017, issued as U.S. Pat. No. 10,447,830 on Oct. 15, 2019, which is a continuation application of U.S. application Ser. No. 15/373,843, filed on Dec. 9, 2016, issued as U.S. Pat. No. 9,843,658 on Nov. 12, 2017, which is continuation application of U.S. application Ser. No. 14/826,317, filed on Aug. 14, 2015, and issued as U.S. Pat. No. 9,537,527 on Jan. 3, 2017, which claims priority from Korean Patent Application Nos. 10-2015-0050718 and 10-2015-0014701, filed on Apr. 10, 2015 and Jan. 30, 2015, respectively, in the Korean Intellectual Property Office and U.S. Provisional Application No. 62/097,223 filed on Dec. 29, 2014 in the USPTO the disclosure of which are incorporated herein by reference in their entirety.

BACKGROUND

1. Field

Apparatuses consistent with exemplary embodiments relate to a user terminal apparatus, and more particularly, to a user terminal apparatus including a flexible display.

2. Description of the Related Art

With the development of an electronic technology, various types of user terminal apparatuses have been developed and widely used. Recently, the user terminal apparatus has more diverse functions while a size of the user terminal apparatus has been minimized, and as a result, a demand for the user terminal apparatus is getting more increased.

The user terminal apparatus may provide various contents, such as multimedia content and application screen, in response to a user's request. A user may use buttons, a touch screen, and the like which are installed in the user terminal apparatus to select functions which he/she wants to use. The user terminal apparatus may optionally execute programs depending on an interaction with the user and display the executed results.

Meanwhile, as functions which may be provided from the user terminal apparatus are gradually diverse, various needs for a method for displaying contents or a user interaction method have been generated. That is, as a kind and a function of contents are still more diverse, the existing interaction method which simply selects the buttons or touches the touch screen may be insufficient.

Therefore, a need for a user interaction technology to enable the user to use the user terminal apparatus more conveniently has emerged.

To this end, the user terminal apparatus has adopted a flexible display. The flexible display has a displaying area on the front surface of the user terminal apparatus and a displaying area on at least one of the sides of the user terminal apparatus.

However, as an upper surface or upper/lower surfaces of the user terminal apparatus are secured as a display area by using the flexible display, there is a need to structurally secure positions of a proximity sensor, a camera hole, an light sensor hole, and the like in addition to a sound output hole (speaker hole) and a sound input hole (microphone hole) which are disposed on the upper surface of the existing user terminal apparatus.

SUMMARY

Exemplary embodiments may overcome the above disadvantages and other disadvantages not described above. However, the exemplary embodiments are not required to overcome the disadvantages described above, and the exemplary embodiments may not overcome any of the problems described above.

The exemplary embodiments may provide a user terminal apparatus capable of transferring an accurate sound to a user during a call as a user terminal apparatus including a flexible display.

Further, the exemplary embodiments provide a user terminal apparatus capable of setting positions of various holes in the user terminal apparatus, such as a sound output hole, a sound input hole, a proximity sensor hole, a camera hole, and a light sensor hole, as optimal positions which do not interfere with a flexible display.

According to an aspect of an exemplary embodiment, there is provided a user terminal apparatus including: a flexible display configured to include a main area and a sub area which extends from the main area to be curved to at least one side of the user terminal apparatus; a housing configured to be adjacent to the flexible display and enclose the flexible display; a sound output hole configured to be positioned between at least one side of the flexible display and the housing and output a received sound at the time of performing a call function; and a sound input hole configured to input a sound.

The sub area may be positioned at an upper part of the user terminal apparatus. The sound output hole may be disposed at a boundary at which an upper part of a bezel and an upper part of the housing which are adjacent to the sub area contact each other.

The sound output hole may be formed in plural and some of the plurality of sound output holes may be disposed at a boundary at which a left of the bezel and a left of the housing contact each other and the rest thereof may be disposed at a boundary at which a right of the bezel and a right of the housing contact each other.

The flexible display may further include an additional sub area which is disposed at a lower part of the user terminal apparatus. The user terminal apparatus may further include: an additional sound output hole configured to be disposed at a boundary at which the lower part of the bezel adjacent to the additional sub area and the lower part of the housing contact each other.

The sound output hole and the additional sound output hole may be disposed at a position which corresponds to a virtual vertical central line of the flexible display.

The sound output hole and the additional sound output hole may be disposed at a position which does not correspond to a virtual vertical central line of the flexible display.

The sound output hole and the additional sound output hole may be disposed to be symmetrical to each other based on a virtual horizontal central line of the flexible display.

The sound output hole may be formed in plural, some of the plurality of sound output holes may be disposed at a boundary at which a left of the bezel and a left of the housing contact each other and the rest thereof may be disposed at a boundary at which a right of the bezel and a right of the housing contact each other, and the plurality of sound output holes may be disposed in a mutual diagonal direction based on the virtual vertical central line of the flexible display.

The sound output hole may be configured to include first and third sound output holes which are disposed at a boundary at which a left of the bezel and a left of the housing contact each other and second and fourth sound output holes which are disposed at a boundary at which a right of the bezel and a right of the housing contact each other, the first and second sound output holes may be each disposed to an adjacent side to the upper part of the housing, and the third and fourth sound output holes may be each disposed to an adjacent side to the lower part of the housing.

The first sound output hole may be symmetrically disposed to the third sound output hole based on a virtual vertical central line of the flexible display and the second sound output hole may be symmetrically disposed to the fourth sound output hole based on the virtual vertical central line of the flexible display.

The sound output hole may be formed in plural and all of the plurality of sound output holes may be disposed at a boundary at which the left of the bezel and the left of the housing contact each other or disposed at a boundary at which a right of the bezel and a right of the housing contact each other.

Some of the plurality of sound output holes may be adjacently disposed to the upper part of the housing and the rest thereof may be adjacently disposed to the lower part of the housing.

The user terminal apparatus may further include: a proximity sensor, wherein the proximity sensor is adjacently disposed to the sound output hole.

The sound output hole may be formed of any one of a long hole, a plurality of circular holes disposed at a predetermined interval, and a single circular hole.

The sound output hole may be formed of a long hole having a length corresponding to at least any one part of the user terminal apparatus. The user terminal apparatus may further include: a plurality of receiver modules configured to output a sound to the long hole inside the user terminal apparatus, wherein the plurality of receiver modules are disposed at a predetermined interval within a section corresponding to a length of the long hole and optionally output a sound depending on a posture of the user terminal apparatus.

According to an aspect of another exemplary embodiment, there is provided a user terminal apparatus including: a flexible display configured to include a main area disposed on a front surface of the user terminal apparatus and a sub area disposed on an upper part of the user terminal apparatus; a bezel configured to enclose the flexible display; a housing configured to enclose the bezel; and a sound output hole configured to output a sound received at the time of performing a call function, wherein the sound output hole is positioned at any one of a boundary between the bezel and the housing, the bezel, and the housing. The flexible display may further include an additional sub area which is disposed at a lower part of the user terminal apparatus.

According to an aspect of another exemplary embodiment, there is provided a user terminal apparatus including: a flexible display including: a main area; and a sub area comprising a curved portion and extending from the main area to a side portion of the user terminal apparatus; a housing configured to enclose the flexible display; a sound output hole provided between the flexible display and the housing and configured to output a sound from a call function; and a sound input hole configured to receive an input sound.

The sub area may be provided at a first end part of the user terminal apparatus.

The sound output hole may be provided at a boundary between a first end part of a bezel and a first end part of the housing, the first end part of the bezel and the first end part of the housing corresponding to the first end part of the user terminal apparatus.

The sound output hole may include a plurality of sound output holes, and wherein at least one of the plurality of sound output holes is disposed at a boundary between a first side part of a bezel and a first side part of the housing and remaining of the plurality of sound output holes are disposed at a boundary between a second side part opposite to the first side part of the bezel and a second side part opposite to the first side part of the housing.

The flexible display may further include an additional sub area which is provided at a second end part opposite to the first end part of the user terminal apparatus.

The user terminal apparatus may further include an additional sound output hole provided at a boundary between a second end part of a bezel adjacent to the additional sub area and a second end part of the housing.

The sound output hole and the additional sound output hole may be provided at a first position and a second position, respectively, intersecting a virtual vertical central line of the flexible display.

The sound output hole and the additional sound output hole may be provided at a first position and a second position, respectively, offset from a virtual vertical central line of the flexible display.

The sound output hole and the additional sound output hole may be provided to be symmetrical to each other with respect to a virtual horizontal central line of the flexible display.

The sound output hole may include a plurality of sound output holes, wherein at least one of the plurality of sound output holes is provided at a boundary between a first side part of a bezel and a first side part of the housing and at least one of remaining of the plurality of sound output holes is disposed at a boundary between a second side part opposite to the first side part of the bezel and a second side part opposite to the first side part of the housing, and wherein the at least one of plurality of sound output holes and at least one of remaining of the plurality of sound output holes are disposed in a diagonal direction with respect to a virtual vertical central line of the flexible display.

The sound output hole may include: a first sound output hole and a third sound output hole which are provided at a boundary between a first side part of a bezel and a first side part of the housing; and a second sound output hole and a fourth sound output hole which are provided at a boundary between a second side part opposite to the first side part of the bezel and a second side part opposite to the first side part of the housing, wherein the first and the second sound output holes are provided at an first end part of the housing corresponding to the first end part of the user terminal apparatus, and wherein the third and the fourth sound output holes are provided at a second end part opposite to the first end part of the housing.

The first sound output hole may be symmetrically provided from the second sound output hole with respect to a virtual vertical central line of the flexible display, and the third sound output hole may be symmetrically provided from the fourth sound output hole with respect to the virtual vertical central line of the flexible display.

The sound output hole may include a plurality of sound output holes, and the plurality of sound output holes are provided at a boundary between a first side part of a bezel and a first side part of the housing or provided at a boundary between a second side part opposite to the first side part of the bezel and a second side part opposite to the first side part of the housing contact each other.

At least one of the plurality of sound output holes may be provided at a first end part of the housing corresponding to the first end part of the user terminal apparatus and at least one of remaining of the plurality of sound output holes are provided at a second end part opposite to the first end part of the housing corresponding to the second end part of the user terminal apparatus.

The user terminal apparatus may further include a proximity sensor, wherein the proximity sensor is provided adjacent to the sound output hole.

The sound output hole may include at least one of an elongated hole, a plurality of circular holes disposed at a predetermined interval, and a single circular hole.

The sound output hole comprises a long hole extending in a direction perpendicular to a thickness direction of the user terminal apparatus and having a length corresponding to a length of a side of the user terminal apparatus.

The user terminal apparatus may further include a plurality of receiver modules provided inside the user terminal apparatus and configured to output the sound to the long hole, wherein the plurality of receiver modules are provided at a predetermined interval along the length of the long hole and selectively output the sound based on a posture of the user terminal apparatus.

According to an aspect of another exemplary embodiment, there is provided a user terminal apparatus including: a flexible display including: a main area provided on a front surface of the user terminal apparatus; and a first sub area extending from the main area and provided on a first end part of the user terminal apparatus; a bezel configured to enclose the flexible display; a housing configured to enclose the bezel; and a sound output hole configured to output a sound received from a call function of the user terminal apparatus, wherein the sound output hole is provided at least one of a boundary between the bezel and the housing, the bezel, and the housing.

The flexible display may further include a second sub area which is provided at a second end part opposite to the first end part of the user terminal apparatus.

According to an aspect of another exemplary embodiment, there is provided a user terminal apparatus including: a flexible display including: a main area; and a first sub area comprising a curved surface and extending from the main area to a first end portion of the user terminal apparatus; a housing configured to enclose the flexible display; and a sound output unit including: a sound output hole provided between the flexible display and the housing and configured to output a sound from a call function to an exterior of the user terminal apparatus; and a receiver module including: a receiver configured to output the sound; and a sound guide configured to guide the sound output from the receiver to the sound output hole, wherein the sound guide may include: a first portion connected to the receiver; and a second portion extending from the first portion and connected to the sound output hole.

The second portion of the sound guide may extend toward an exposed surface of the flexible display, and the second portion of the second guide may be inclined with respect to a plane extending in a thickness direction of the user terminal apparatus.

The second portion of the second guide may be inclined toward a center of the flexible display with respect to the plane extending in the thickness direction of the user terminal apparatus.

According to an aspect of another exemplary embodiment, there is provided a user terminal apparatus including: a flexible display including: a main area; and a sub area comprising a curved surface and extending from the main area to an end portion of the user terminal apparatus; a housing configured to enclose the flexible display; and a sound output unit including: a sound output hole provided between the flexible display and the housing and configured to output a sound from a call function to an exterior of the user terminal apparatus; and a receiver module including: a receiver configured to output the sound; a sound guide configured to guide the sound from the receiver to the sound output hole; an air temperature controller configured to control air temperature around the sound output hole.

The air temperature controller may include: a low temperature block provide on a first surface of the sound guide; and a high temperature block provide on a second surface opposite to the first surface of the sound guide.

The low temperature block may be configured to cool air on a first side of the sound guide; and the high temperature block may be configured to heat the air on a second side opposite to the first side of the sound guide.

The air temperature controller may further include a heat insulation block provided on the high temperature block and configured to block contact between the high temperature block and the low temperature block.

BRIEF DESCRIPTION OF THE DRAWINGS

The above and/or other aspects of the disclosure will be more apparent by describing certain exemplary embodiments of the present invention with reference to the accompanying drawings, in which.

DETAILED DESCRIPTION

Reference will now be made in detail to the exemplary embodiments, examples of which are illustrated in the accompanying drawings. Further, to help understanding of the inventive concept, the accompanying drawings are not necessarily illustrated to scale but dimensions of some components may be illustrated to be exaggerated.

Figure 1:
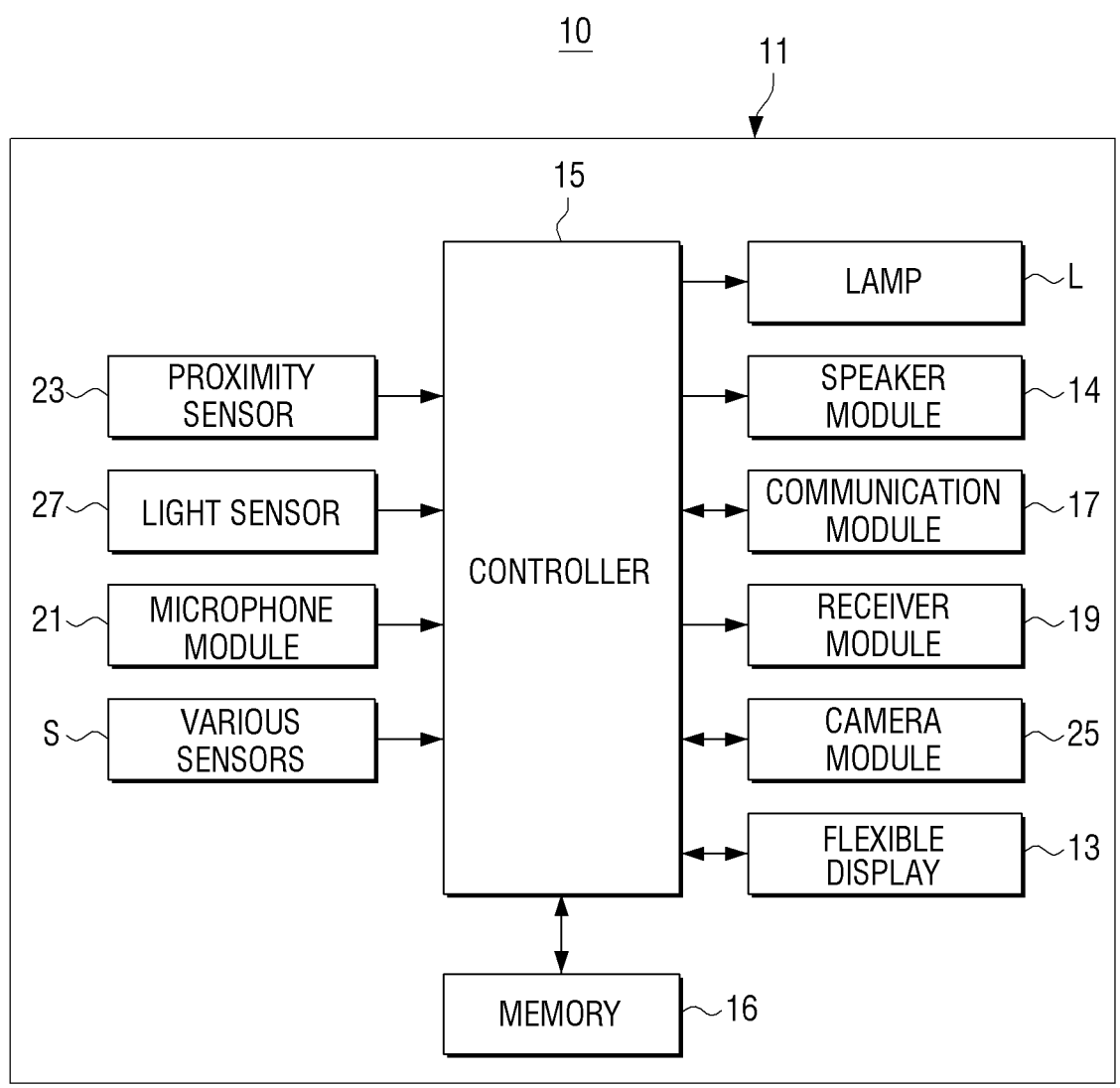
FIG. 1 is a block diagram illustrating a user terminal apparatus according to an exemplary embodiment.
Figure 2A:
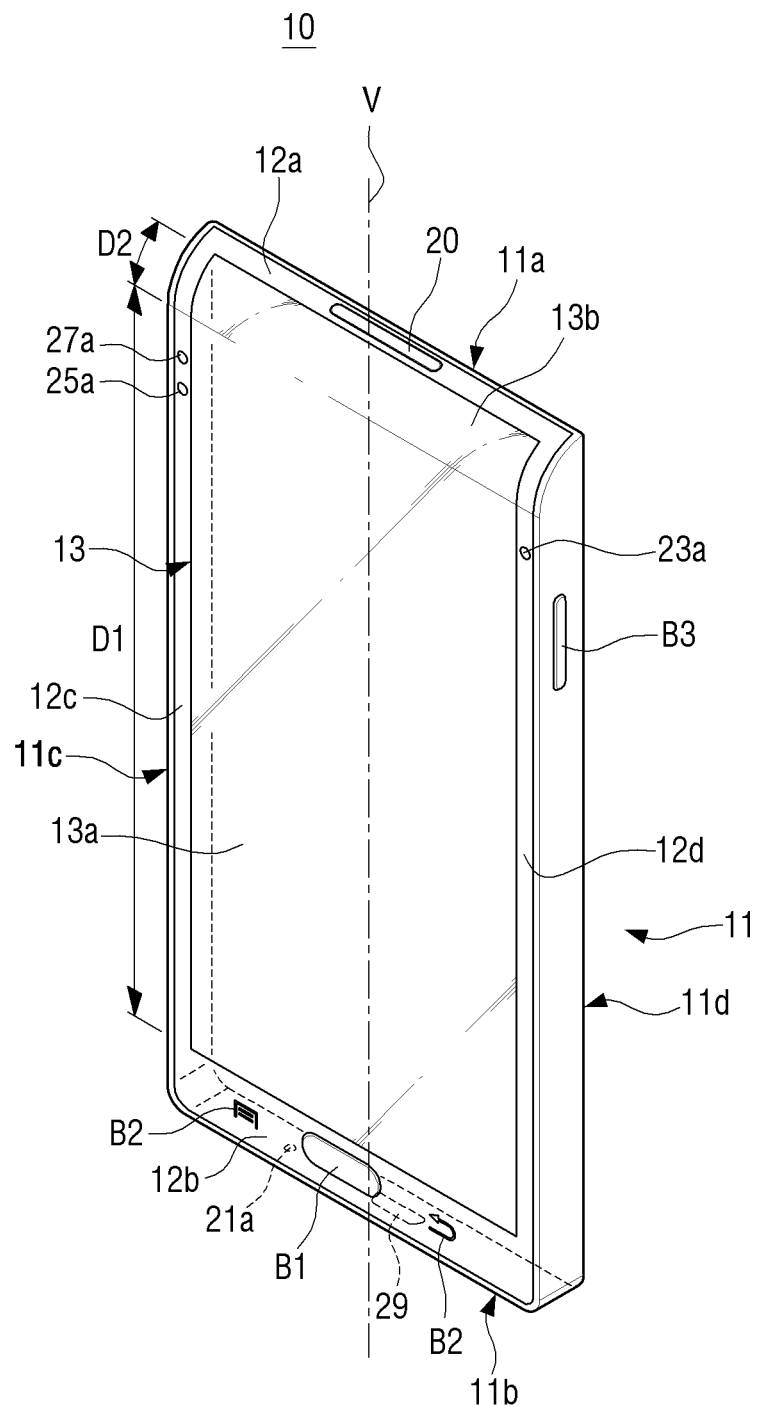
FIG. 2A is a diagram illustrating the user terminal apparatus according to an exemplary embodiment and is a perspective view illustrating an example in which a sound output hole is disposed at an upper part of the user terminal apparatus.
Figure 2B:
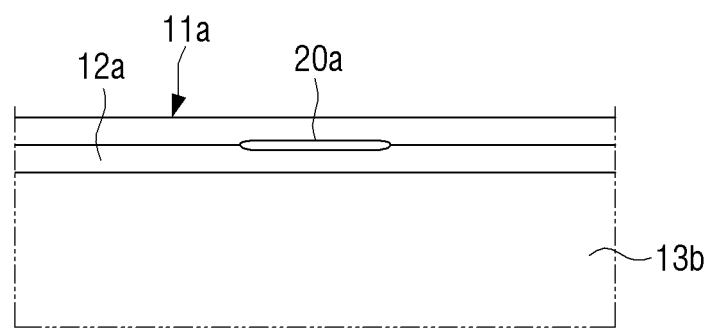
FIGS. 2B to 2D are diagrams schematically illustrating various formation positions of the sound output holes which may be implemented according to an exemplary embodiment.
Figure 2C:
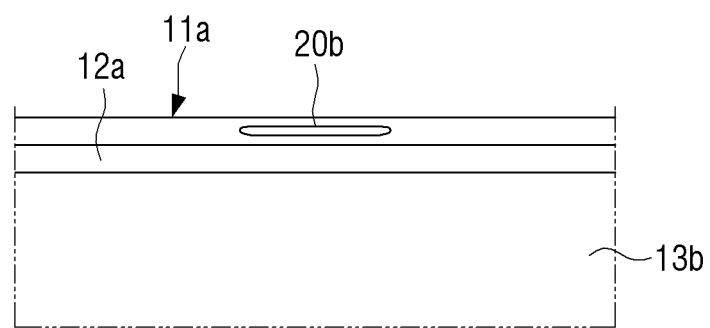
Figure 2D:
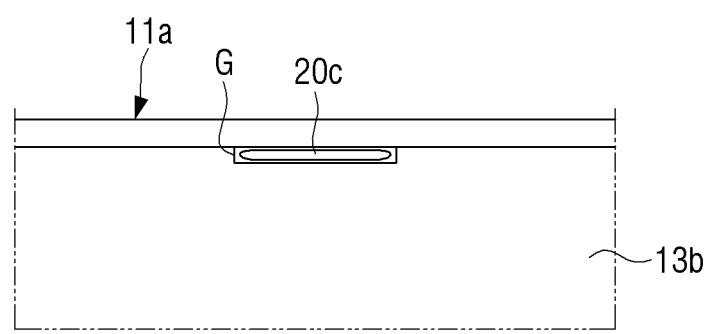
Figure 3:
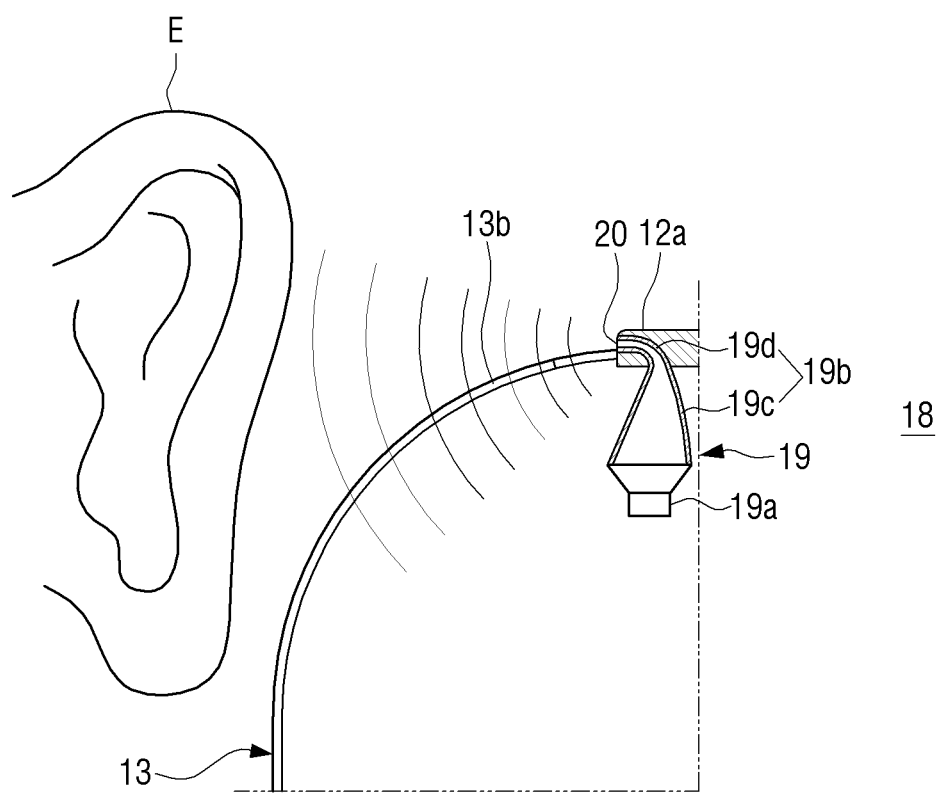
FIG. 3 is a cross-sectional view illustrating a sound output unit which is disposed within the user terminal apparatus and a sound output hole which communicates with a sound guide path of the sound output unit together.

FIG. 1 is a block diagram illustrating a user terminal apparatus 10 according to an exemplary embodiment. FIG. 2A is a diagram illustrating a user terminal apparatus 10 according to an exemplary embodiment and is a perspective view illustrating an example in which a sound output hole 20 is disposed at an upper part 11a of the user terminal apparatus 10. FIGS. 2B to 2D are diagrams schematically illustrating various formation positions of sound output holes 20a, 20b and 20c which may be implemented according to an exemplary embodiment. FIG. 3 is a cross-sectional view illustrating a sound output unit 18 which is disposed within the user terminal apparatus 10 and a sound output hole 20 which communicates with a sound guide path of the sound output unit 18 together. Referring to FIGS. 1 and 2A, the user terminal apparatus 10 according to an exemplary embodiment includes a housing 11, a flexible display 13, a speaker module 14, a controller 15, a communication module 17, a receiver module 19, a microphone module 21, a proximity sensor 23, a camera module 25, and an light sensor 27.

The housing 11 may be formed in a portable size, and preferably, may be formed in a size capable of communication while being lifted with one hand. A flexible display 13 is disposed on a front surface of the housing 11. In addition, high-strength glass for protecting the flexible display 13 may be disposed on a front surface of the flexible display 13.

The flexible display 13 may be a display which does not generate an input signal by a touch or may be a display which inputs a predetermined command by various contact forms, such as sliding in a state in which it is touched at least once by a portion (for example, finger) of a user's body or contacts a portion of a user's body. The controller 15 may receive a signal input through the flexible display 13 to drive applications stored in the memory 16 or display an image corresponding to the corresponding signal on the flexible display 13.

The flexible display 13 may form a front surface and an upper surface of the user terminal apparatus 10. Further, the flexible display 13 includes a main area 13a which is disposed on the front surface of the user terminal apparatus 10 and a sub area 13b which extends towards an upper surface of the user terminal apparatus 10 from the main area 13a to be curved with a predetermined curvature. As shown in FIG. 2A, the main area 13a is denoted as a section D1 which is formed in a plane from a lower part 11b of the housing toward an upper part 11a of the housing as a substantially flat surface and the sub area 13b is denoted as a section D2 which extends from the upper part 11a to the main area 13a as a curved surface as an exemplary embodiment. However, the exemplary embodiment is not limited thereto. The section D1 and D2 may take various forms based on design intent.

In the exemplary embodiment, an upper part, a lower part, a left part, and a right part of the flexible display 13 are enclosed with an upper part 12a, a lower part 12b, a left part 12c, and a right part 12d of a bezel and the upper part 12a, the lower part 12b, the left part 12c, and the right part 12d of the bezel are each enclosed with the upper part 11a, the lower part 11b, a left part 11c, and a right part 11d of the housing 11 which form the outside of the housing 11.

In the user terminal apparatus 10, the lower part 12b of the bezel which contacts the lower part 11b of the housing may be provided with a physical key button B1 and both sides of the physical key button B1 may each be provided with soft key buttons B2 as shown in FIG. 2A as an exemplary embodiment. Further, a side of the right part 11d of the housing may be provided with a physical key button B3 which turns on/off a screen of the flexible display 13 or turns on/off a power supply of the user terminal apparatus 10.

The upper part 12a of the bezel is formed to have a width narrower than the lower part 12b of the bezel in a length direction (i.e., a direction from the lower part 12b to the upper part 12a of the bezel) of the user terminal apparatus 10. As such, the upper part 12a of the bezel may be formed to be reduced as the foregoing sub area 13b of the flexible display 13 occupies a portion corresponding to the upper surface of the user terminal apparatus 10.

The speaker module 14 is disposed inside the housing 11 and outputs a sound of multimedia contents like music, moving pictures, game, or the like through a speaker hole (not illustrated) which is formed on a back cover (not illustrated) opening and closing a back surface of the housing 11. Meanwhile, when the housing 11 has a closed back surface without including a separate back cover, the speaker module 14 may output the sound of the multimedia contents like music, moving pictures, game, or the like through the speaker hole which is formed on the back surface (not illustrated) of the housing 11.

Further, the speaker module 14 may also output a call sound through the controller 15 during a call, in place of the receiver module 19. For this purpose, a user may select a menu which may communicate in a speaker mode among call menus which are displayed on the flexible display 13 during a call connection to output the call sound, instead of the receiver module 19.

The controller 15 is electrically connected to the flexible display 13, the speaker module 14, the communication module 17, the receiver module 19, the microphone module 21, the proximity sensor 23, the camera module 25, and the light sensor 27, respectively to receive or transmit a signal from or to each component, thereby controlling each component. Further, the controller 15 accesses the memory 16 (internal memory and external memory) to store data and drive various kinds of applications which are installed in each memory 16 in advance.

The communication module 17 includes various kinds of communication circuits which may perform remote communications (2G, 3G, and 4G) and near field communications (Wi-Fi, NFC, Bluetooth, or the like). The communication module 17 transmits and receives a communication signal to and from the controller 15 and the controller 15 converts the received signal into a sound signal and outputs the sound signal through the receiver module 19 and converts the sound signal input from the microphone module 21 into the communication signal and transmits the communication signal to various kinds of external wired and wireless communication devices through the communication module 17.

Referring to FIG. 3, the receiver module 19 receives the sound signal from the controller 15 to output a sound to the outside of the user terminal apparatus 10 through the sound output hole 20. The receiver module 19 includes a receiver 19a and a sound guide 19b.

The receiver 19a may use the typical small or subminiature speaker in consideration of the size of the user terminal apparatus 10 and may be adjacently disposed on an inner surface of the upper part 12a of the bezel within the housing 11. In the exemplary embodiment, the receiver 19a may use a bone-conduction speaker (not illustrated), instead of the typical small or subminiature speaker and may also be used as a hybrid type in which the typical small or subminiature speaker and the bone-conduction speaker are combined with each other. When the receiver 19a is used as the bone-conduction speaker, the receiver 19a may be positioned on the back surface of the flexible display 13 and the back surface of the housing 11. When the bone-conduction speaker is positioned on the back surface of the housing 11, the bone-conductor speaker may be positioned at approximately a middle portion of the upper part of the housing 11 or may be positioned at both corners of the upper part of the housing 11.

The sound guide 19b has one end portion 19c (i.e., a first end portion along the sound guide path) connected to the receiver 19a to collect the sound output from the receiver 19a and the other end portion 19d (i.e., a second end portion along the sound guide path) connected to the sound output hole 20. The sound output from the receiver 19a during a call is transferred to a user's ear E through the sound output hole 20.

Referring back to FIG. 2A, the sound output hole 20 may be formed at a portion of the upper part 12a of the bezel. However, the formation position of the sound output hole 20 is not limited thereto and may be variously set as illustrated in FIGS. 2B to 2D. Referring to FIG. 2B, the sound output hole 20a may be disposed between the upper part 11a of the housing and the upper part 12a of the bezel. In detail, a portion of the sound output hole 20a may be disposed at the upper part 11a of the housing and the remaining portion thereof may be disposed at the bezel 12a. Further, as illustrated in FIG. 2C, the sound output hole 20b may be formed at only a portion of the upper part 11a of the housing. Further, as illustrated in FIG. 2D, when the bezel disposed between the flexible display 13 and the housing 11 is omitted, a predetermined groove G is formed at a portion of the sub area 13b of the flexible display 13 contacting the upper part 11a of the housing and a sound output hole 20c may be disposed in the predetermined groove G.

As the sub area 13b of the flexible display 13 is disposed on the upper surface of the user terminal apparatus 10 according to the exemplary embodiment, the sound output hole 20 is positioned to be higher than the existing user terminal apparatus. To solve the problem in that the sound is not properly transferred to the user's ear E due to the disposition of the sound output hole 20, the other end 19d (i.e., the second end along the sound guide path) of the sound guide 19b is formed to be curved toward the front of the user terminal apparatus 10. A shape of the other end 19d of the sound guide 19b has direct effect in transferring the sound, which is output to the outside through the sound output hole 20 during a call, toward the user's ear E. Further, the sound output hole 20 together with the shape of the other end 19d of the sound guide 19b may be disposed to head for approximately the front of the user terminal apparatus 10.

Figure 4:
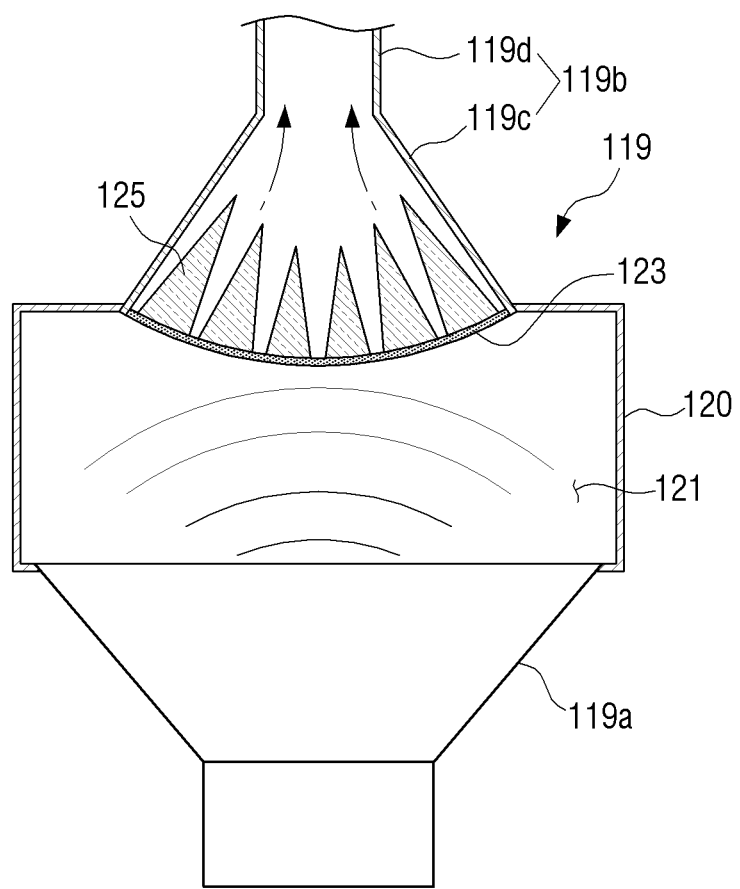
FIG. 4 is a diagram schematically illustrating an example in which a compression drive structure to prevent a distortion of sound output from the sound output unit which is disposed within the user terminal apparatus is adopted.

Meanwhile, when the sound output from the receiver 19a is collected to a space narrower than a tip of a cone part of the receiver 19a, a sound may be distorted due to a phase difference between the sound output from a center and an outer side of the receiver 19a. FIG. 4 is a diagram schematically illustrating an example in which a compression drive structure to prevent a distortion of sound output from the sound output unit 118 which is disposed within the user terminal apparatus is adopted.

To prevent the sound from being distorted, as illustrated in FIG. 4, a receiver module 119 may include a compression drive structure 120 including a connection part 120a, a vibration plate 123 and phase plugs 125. That is, a receiver 119a is connected to a sound guide 119b through the connection part 120a having the vibration plate 123. The vibration plate 123 is formed to be depressed toward an inner space 120b of the connection part 120a. A side of the vibration plate 123 to which the sound guide 119b is connected is provided with phase plugs 125. When the receiver module 119 has the foregoing compression drive structure, a sound output from the receiver 119a is transferred to the vibration plate 123 and then collected by the phase plugs 125 without being distorted, and is output to the sound output hole 20 through the other end 119d of the sound guide 119b and then transferred to the user's ear E.

Figure 5:
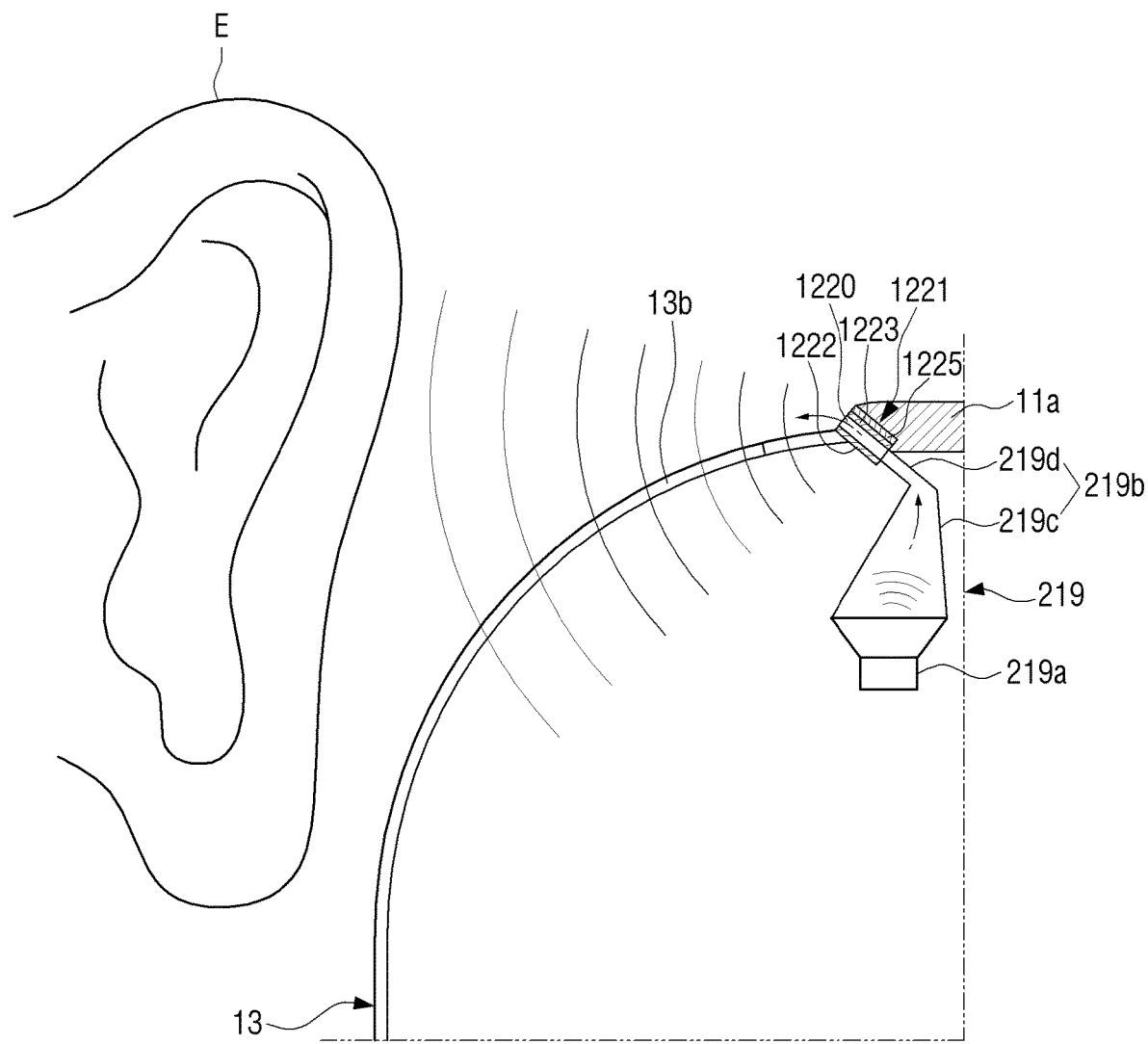
FIG. 5 is a diagram schematically illustrating an air temperature controller for transferring the sound output from the sound output hole in a desired direction.
Figure 6:
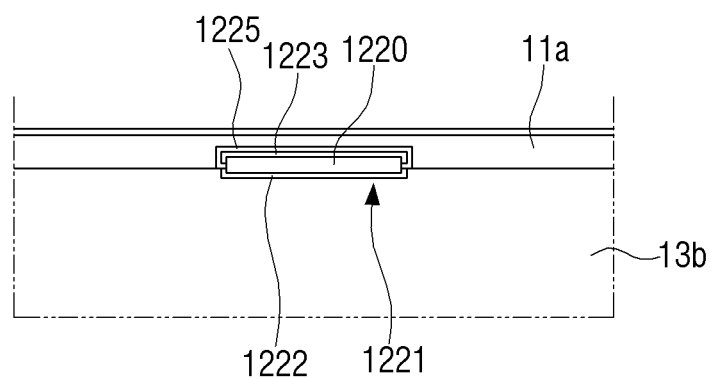
FIG. 6 is a partially enlarged plan view illustrating an air temperature controller which is disposed at the upper part of the user terminal apparatus illustrated in FIG. 5.
Figure 7:
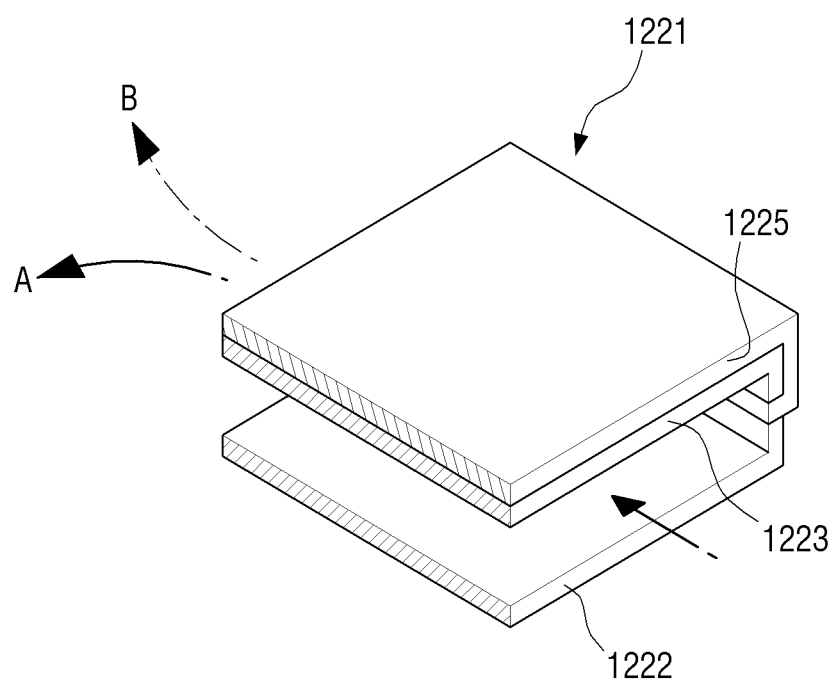
FIG. 7 is a partially cut cross-sectional view illustrating a transfer direction of the sound passing through an air temperature controller according to an exemplary embodiment.

Meanwhile, the sound output hole 20 may be formed long and may be disposed to be approximately parallel along a boundary between the upper part 11a of the housing and the upper part 12a of the bezel. FIG. 5 is a diagram schematically illustrating an air temperature controller 1221 for transferring the sound output from the sound output hole 1220 in a desired direction. FIG. 6 is a partially enlarged plan view illustrating an air temperature controller 1221 which is disposed at the upper part of the user terminal apparatus 10 illustrated in FIG. 5. FIG. 7 is a partially cut cross-sectional view illustrating a transfer direction of the sound passing through an air temperature controller 1221 according to an exemplary embodiment.

Referring to FIG. 5, when the other end portion 219d (i.e., a second end portion along the sound guide path shown with an arrow) of the sound guide 219b is disposed to be inclined to the upper part of the front surface of the user terminal apparatus 10, the sound output from the sound output hole 1220 may be transferred toward the user's ear E through the air temperature controller 1221 which may control air temperature around the sound output hole 1220.

As illustrated in FIG. 6, the air temperature controller 1221 is disposed to enclose the other end 219d of the sound guide 219b and may include a low temperature block 1222, a high temperature block 1223, and a heat insulation block 1225. The low temperature block 1222 and the high temperature block 1223 are each connected to a cooling side and a heating side of a Peltier device (not illustrated) disposed inside the user terminal apparatus 10 to cool and heat air around the sound output hole 1220. Further, the low temperature block 1222 may be connected to a predetermined cooling structure disposed inside the user terminal apparatus 10 or the high temperature block 1223 may also use heat from a predetermined heater disposed inside the user terminal apparatus 10 or a heat generation part inside the user terminal apparatus 10. The heat insulation block 1225 blocks a contact with the low temperature block 1222 while enclosing an outside of the high temperature block 1223.

Referring to FIG. 7, when the air temperature controller 1221 is operated during a call, the low temperature block 1222 is cooled and while the high temperature block 1223 is heated, and thus air within the other end 219d of the sound guide 219b is cooled at a lower side and is heated at an upper side. Therefore, the sound passing through the other end 219d of the sound guide 219b is transferred downward (arrow A direction). Therefore, the sound may be transferred toward the user's ear E (accurately, user's earhole) side.

In some cases, the positions of the low temperature block 1222 and the high temperature block 1223 may also be disposed to be opposite to each other. In this case, like an arrow B direction illustrated in FIG. 7, the sound output from the sound output hole 1220 may be transferred upward. That is, the sound output travels toward an area where the low temperature block 1222 is located and away from an area where the high temperature block 1223 is located.

Referring back to FIG. 2A, the sound output hole 20 may be disposed at a position corresponding to a virtual vertical central line V of the flexible display 13 and may also be disposed at a position which is biased to a left or a right from the vertical central line V.

FIGS. 8A to 8D are partially enlarged plan views of a user terminal apparatus 10 including various forms of sound output holes 20d, 20e and 20f.

The sound output hole 20 may be provided with a mesh type net or grill (not illustrated) to prevent foreign materials from being introduced.

Figure 8A:
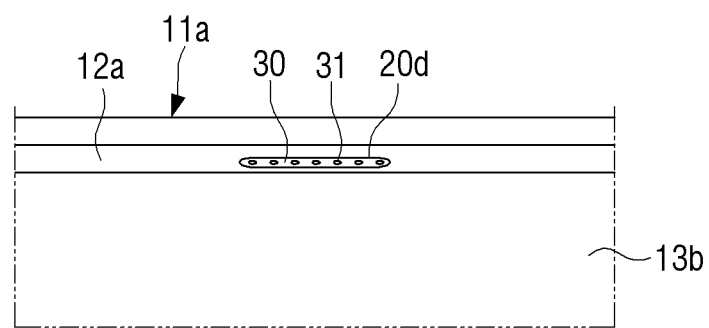
FIGS. 8A to 8D are partially enlarged plan views of the user terminal apparatus illustrating various forms of sound output holes.
Figure 8B:
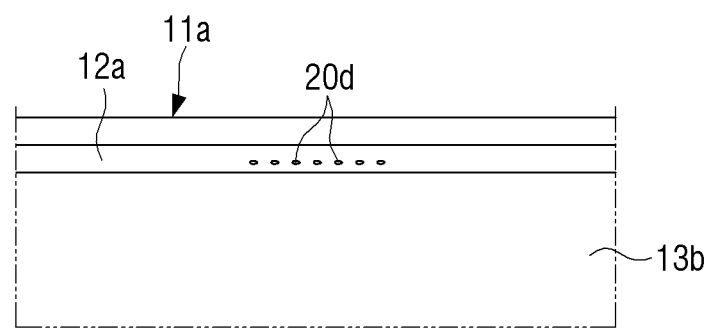
Figure 8C:
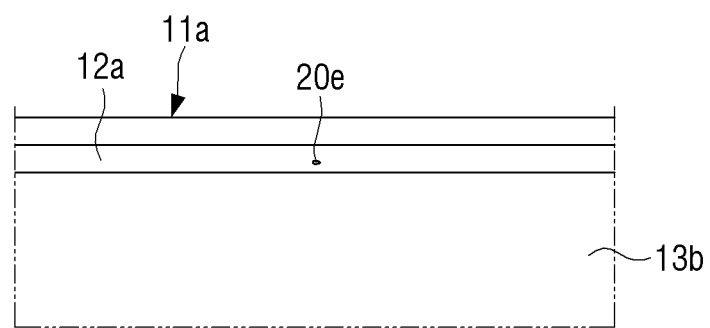

Further, as illustrated in FIG. 8A, the sound output hole 20d may be coupled with a cover 30 on which a plurality of holes 31 are formed. Further, as illustrated in FIG. 8B, the sound output hole 20d may be formed in a plurality of circular holes which are formed on the upper part 12a of the bezel of the user terminal apparatus 10 at a predetermined interval. In addition, the sound output hole 20d formed of the plurality of circular holes may also be disposed at a boundary at which the upper part 11a of the housing and the upper part 12a of the bezel contact each other. The plurality of sound output holes 20d illustrated in FIGS. 8A and 8B each communicate with the other end 19d of the sound guide 19b as shown in FIG. 3. Further, referring to FIG. 8C, a sound output hole 20e may also be formed in a very small hole shape as a single dot shape.

Figure 8D:
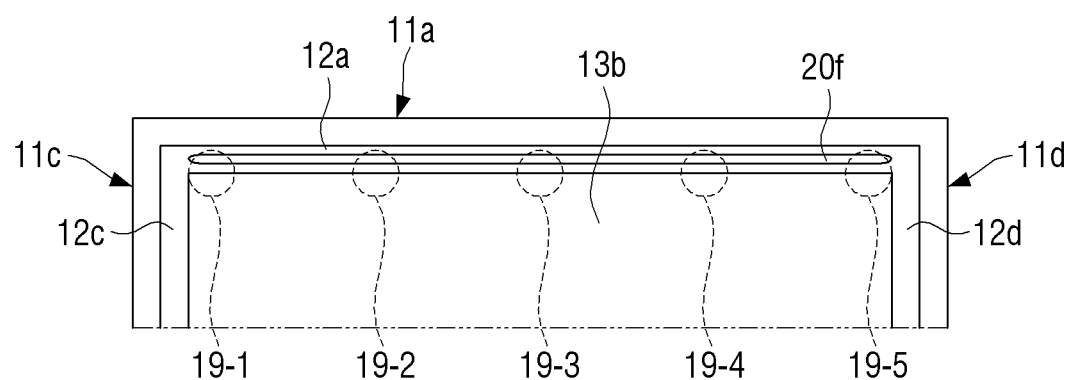

Further, as illustrated in FIG. 8D, a sound output hole 20f may also be formed in a long hole shape along the upper part 12a of the bezel to have a length approximately corresponding to a length of a side of an upper part of the user terminal apparatus 10. Further, although not illustrated in the drawings, the sound output hole 20f may also be formed on the back surface of the user terminal apparatus 10.

Figure 8E:
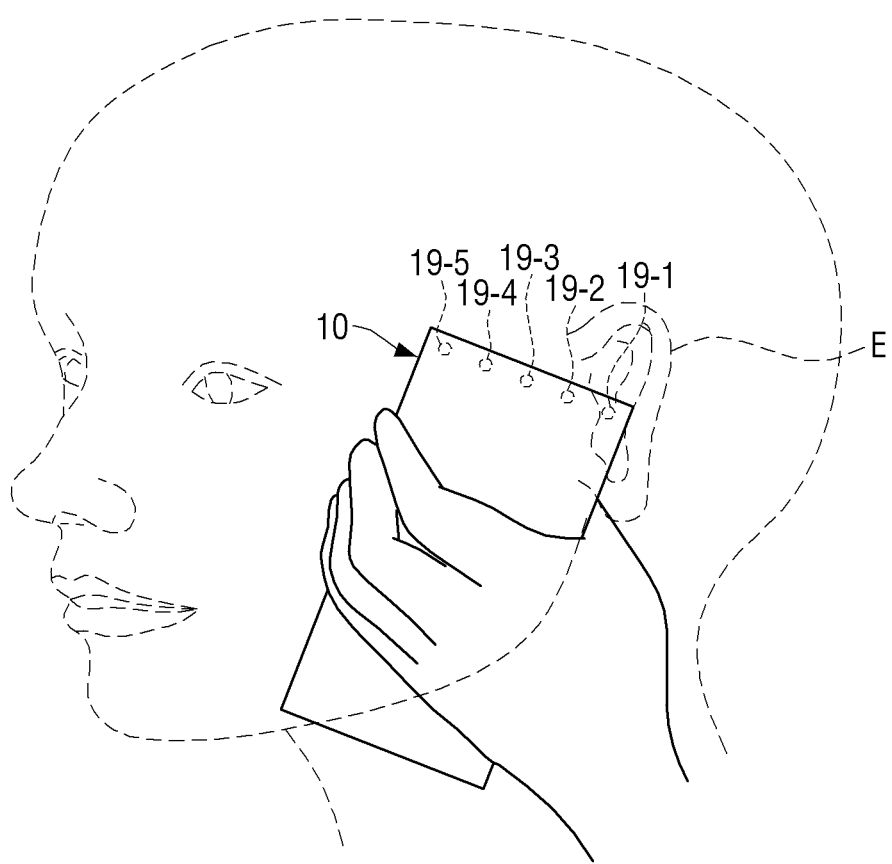
FIGS. 8E to 8G are diagrams schematically illustrating an example in which a receiver module adjacent to a user's ear among a plurality of receiver modules is changed depending on various postures at which the user lifts the user terminal apparatus when the sound output hole as illustrated in FIG. 8D is applied.
Figure 8F:
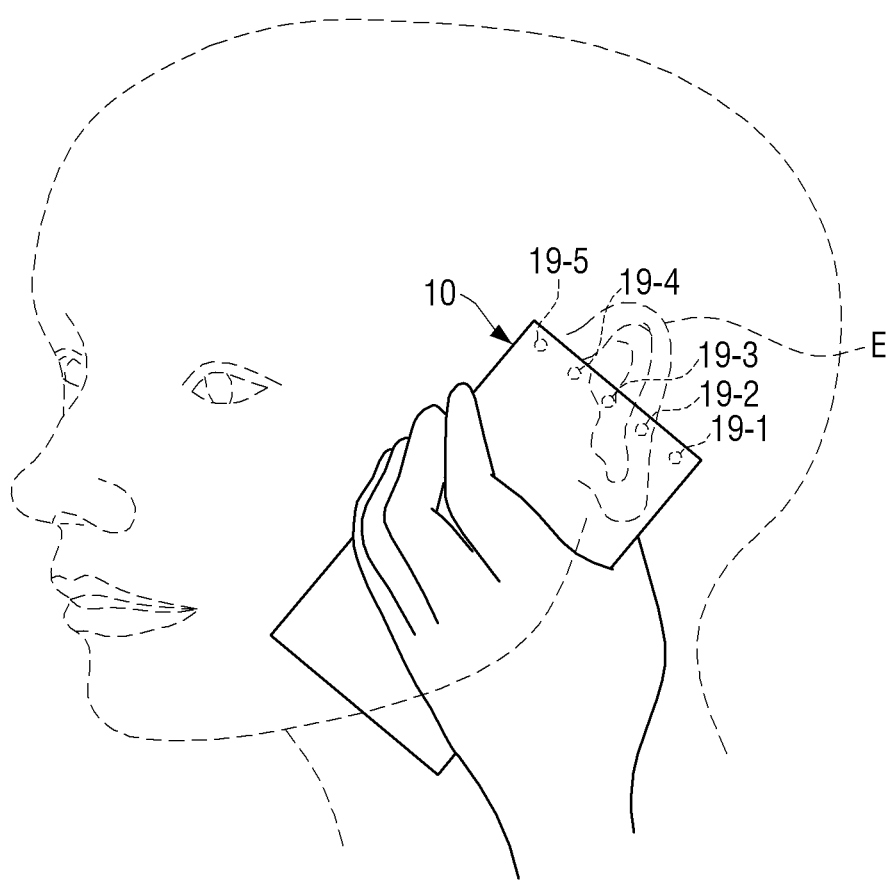
Figure 8G:
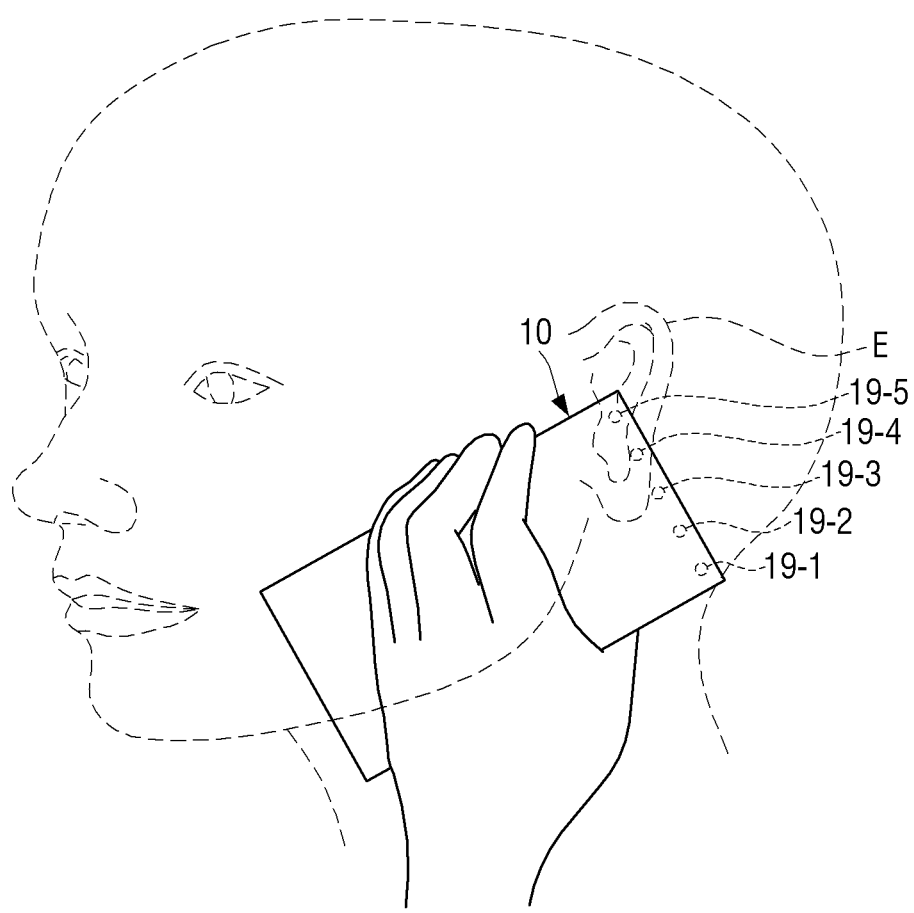

FIGS. 8E to 8G are diagrams schematically illustrating an example in which a receiver module 19 adjacent to a user's ear E among a plurality of receiver modules 19-1, 19-2, 19-3, 19-4, and 19-5 is changed depending on various postures at which the user lifts the user terminal apparatus 10 when the sound output hole as illustrated in FIG. 8D is applied.

In the exemplary embodiment, the receiver module 19 may include a plurality of receiver modules 19-1, 19-2, 19-3, 19-4, and 19-5 and each of the receiver modules 19-1, 19-2, 19-3, 19-4, and 19-5 may be arranged at a predetermined interval in consideration of the length of the sound output hole 20f as shown in FIG. 8D. The controller 15 may turn on all of the plurality of receiver modules 19-1, 19-2, 19-3, 19-4, and 19-5 during a call to output a call sound through the sound output hole 20f and may optionally turn on at least one of the plurality of receiver modules 19-1, 19-2, 19-3, 19-4, and 19-5 depending on a user posture at which the user lifts the user terminal apparatus 10 and use the turned on receiver module. Describing in detail, the controller 15 may use the motion sensor (acceleration, gyro, earth magnetic field, etc.), the proximity sensor 23, the light sensor 27, and the like to determine the posture of the user terminal apparatus 10 (see FIGS. 8E to 8G) during a call. Therefore, when the user posture at which the user lifts the user terminal apparatus 10 as illustrated in FIG. 8E is sensed, the controller 15 may turn on only the first receiver module 19-1 or the first and second receiver modules 19-1 and 19-2 which are adjacently disposed to the user's ear E to output a call sound. Further, when the posture as illustrated in FIG. 8F is sensed, the controller 15 may turn on only the third receiver module 19-3 or the second to fourth receiver modules 19-2, 19-3 and 19-4 which are adjacently disposed to the user's ear E to output a call sound. Further, when the posture as illustrated in FIG. 8G is sensed, the controller 15 may turn on only the fifth receiver module 19-5 or the fourth and fifth receiver modules 19-4 and 19-5 which are adjacently disposed to the user's ear E to output a call sound.

The proximity sensor 23 senses when the user's face approaches the flexible display 13 during a call and transmits a proximity signal to the controller 15. The controller 15 may stop the touch function of the flexible display 13 in response to the receiving of the proximity signal and cut off a power supply of a liquid crystal display to perform a power saving function. The proximity sensor 23 may use any one of a high frequency oscillation type, a capacitive type, a magnetic type, a photoelectric type, and an ultrasonic type depending on a detection principle.

The proximity sensor 23 may be adjacently dispose to the sound output hole 20 to detect the user's face during a call. For this purpose, according to the exemplary embodiment, as illustrated in FIG. 2A, the proximity sensor 23 may be disposed to correspond to a proximity sensor hole 23a which is disposed on the upper part of the right part 12d of the bezel of the user terminal apparatus 10. However, the proximity sensor 23 is not limited to such position, and therefore if the proximity sensor 23 is disposed at a position at which the user's face may be sensed when the user moves the user terminal apparatus 10 to his/her face during a call, the proximity sensor 23 may also be disposed at a proper position of any one of the upper part 12a of bezel, the lower part 12b of the bezel, and the left 12c part of the bezel of the user terminal apparatus 10.

Figure 9A:
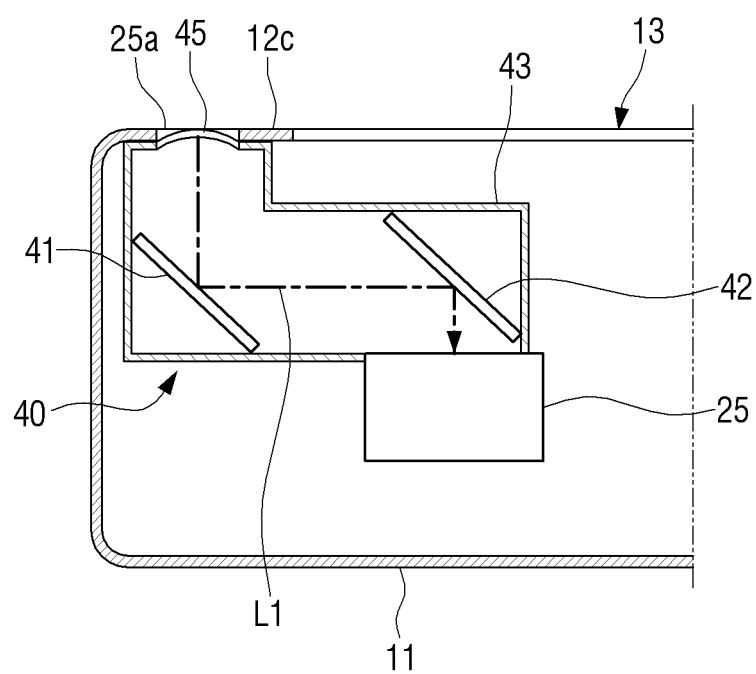
FIG. 9A is a diagram schematically illustrating a structure for transferring external light to a camera module disposed inside the user terminal apparatus through a plurality of mirrors according to an exemplary embodiment.
Figure 9B:
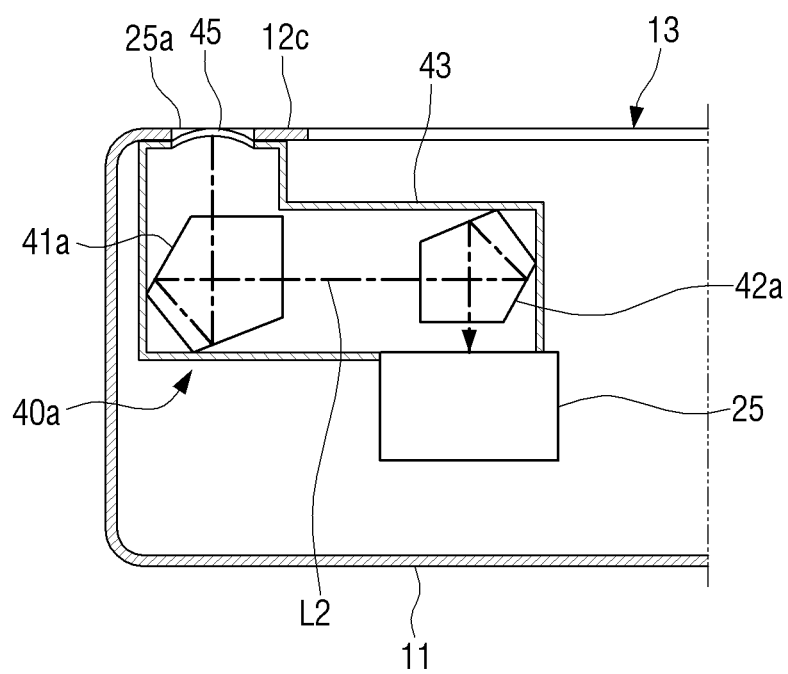
FIG. 9B is a diagram schematically illustrating the structure for transferring the external light to the camera module disposed inside the user terminal apparatus through a plurality of prisms according to an exemplary embodiment.

FIG. 9A is a diagram schematically illustrating a structure for transferring external light to a camera module 25 disposed inside the user terminal apparatus 10 through a plurality of mirrors 41 and 42 and FIG. 9B is a diagram schematically illustrating the structure for transferring the external light to the camera module 25 disposed inside the user terminal apparatus through a plurality of prisms 41a and 42a. The camera module 25 may include a lens, a lens holder, and an image sensor (a charge coupled device (CCD) image sensor or a complementary metal oxide semiconductor (CMOS) image sensor).

Due to the left part 12c of the bezel formed at a narrow width of the user terminal apparatus 10, the camera module 25 is not disposed just at a back of the camera hole 25a (see FIG. 2A) but is adjacently disposed to the left 12c of the bezel, in which an optical axis of the lens is disposed to be biased with respect to the camera hole 25a. In this case, as illustrated in FIG. 9A, a path of a light incident into the user terminal apparatus 10 through the camera hole 25a is changed by a light path change unit 40 so that a first light path L1 is formed toward the optical axis of the camera module 25.

The light path change unit 40 includes a first mirror 41, a second mirror 42, and a path type support part 43 supporting each of the mirrors 41 and 42. The camera hole 25a is provided with an additional glass 45 to prevent foreign materials from being introduced. In this case, the first mirror 41 reflects light incident into the user terminal apparatus 10 through the camera hole 25a to the second mirror 42. The second mirror 42 reflects light, which is reflected from the first mirror 41, to the camera module 25.

Meanwhile, as illustrated in FIG. 9B, in an exemplary embodiment, a light path change unit 40a may include first and second prisms 41a and 42a, instead of a pair of mirrors 41 and 42 shown in FIG. 9A. As such, the first and second prisms 41a and 41b are each disposed at positions corresponding to the foregoing first and second mirrors 41 and 42 to transfer the light incident into the user terminal apparatus 10 through the camera hole 25a to the camera module 25 along a second light path L2.

As described above, when the left part 12c of the bezel of the user terminal apparatus 10 is formed to be narrow, external light may be accurately transferred to the camera unit 25 which is disposed inside the user terminal apparatus 10 through the foregoing light path change units 40 and 40a.

According to the exemplary embodiment, the camera hole 25a is formed at the left part 12c of the bezel of the user terminal apparatus 10 but the exemplary embodiment is not limited thereto, and therefore the camera hole 25a may be formed, for example, at the right part 12d of the bezel of the user terminal apparatus 10. Further, the user terminal apparatus 10 according to the exemplary embodiment of the present invention may further include a lamp L serving as a flash which helps to take photograph even at a dark place at the time of photographing by a camera.

The light sensor 27 detects brightness (light quantity) around the user terminal apparatus 10 to transmit a light quantity detection signal to the controller 15. The controller 15 may respond to the light quantity detection signal to control the brightness of the flexible display 13 and may automatically control sensitivity (international organization for standardization (ISO)) which is a physical numerical value representing a response degree of the camera sensor to light at the time of the photograph shooting using the camera module 25.

Figure 10:
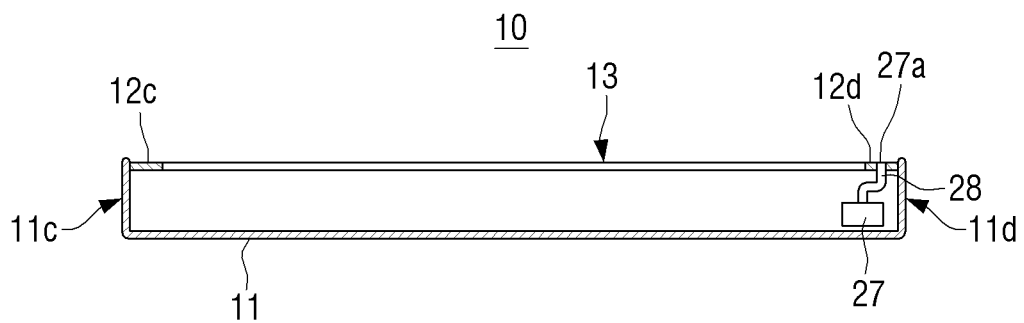
FIG. 10 is a diagram schematically illustrating a light sensor disposed inside the user terminal apparatus and an optical waveguide through which the external light is transferred to the light sensor.

FIG. 10 is a diagram schematically illustrating a light sensor 27 disposed inside the user terminal apparatus 10 and an optical waveguide 28 through which the external light is transferred to the light sensor 27. As illustrated in FIG. 10, the light sensor 27 is installed inside the housing 11 and receives the external light of the user terminal apparatus 10 through the optical waveguide 28. In the exemplary embodiment, the optical waveguide 28 may be formed of an optical fiber and an end of the optical waveguide 28 is connected to the light sensor hole 27a formed at the right 12d of the bezel of the user terminal apparatus 10 and the other end of the optical waveguide 28 is connected to the light sensor 27.

As such, the light sensor 27 is connected to the optical waveguide 28 in consideration of the right part 12d of the bezel having the narrow width of the user terminal apparatus 10 and therefore the position of the light sensor 27 may be freely set, for example, at an inner side of the light sensor hole 27a in the user terminal apparatus 10.

Further, the user terminal apparatus 10 may include various kinds of sensors S (see FIG. 1) to implement various functions as described below, in addition to the foregoing components. That is, the user terminal apparatus 10 may include a gyroscope sensor which recognizes a total of six axes rotation, respectively to help recognize a more precise operation, a geo-magnetic sensor which is an electronic compass capable of detecting an azimuth using a geo-magnetic field and is used for a navigation, position tracking, a three-dimensional stereoscopic game, a compass, and the like, an accelerometer which senses the direction and motion of the user terminal apparatus 10 and is used in various applications, and a gravity sensor (G-sensor) for performing a surrounding noise removing function automatic operation when the user terminal apparatus 10 is shaken during a call or a switching function of vertical/horizontal viewing depending on a slope of a screen. Further, the lower part 11b of the user terminal apparatus 10 may be provided with a charging port 29 (see FIG. 1) for supplying power to a battery which is disposed inside the user terminal apparatus 10.

In the user terminal apparatus 10 according to the exemplary embodiment configured as described above, when the upper surface of the user terminal apparatus 10 is provided with the sub area 13b of the flexible display 13, the sound output hole 20 may be disposed at the upper part 11a of the user terminal apparatus 10. In this case, the sound output from the sound output hole 20 is controlled to have directivity and thus the user may easily receive the sound.

Figure 11:
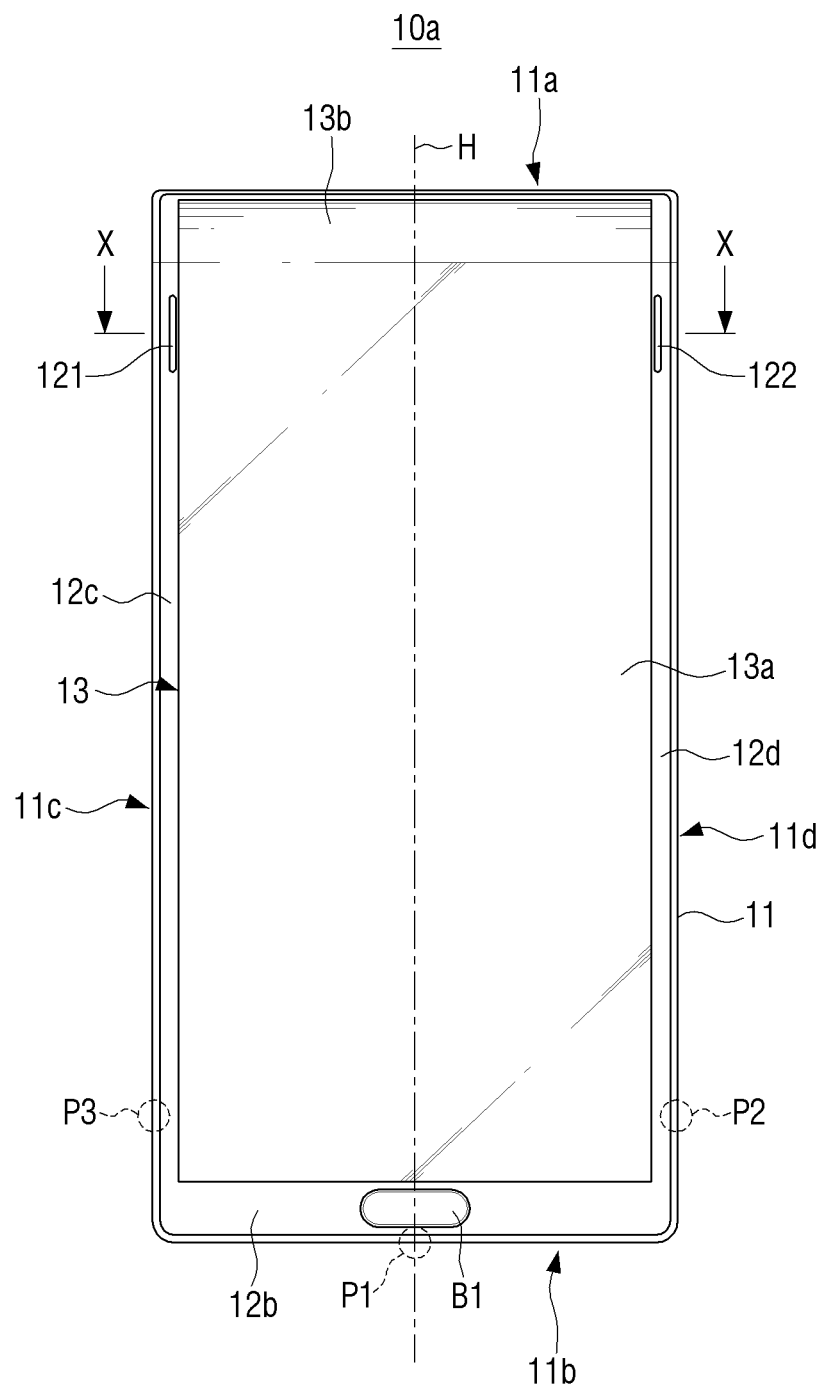
FIG. 11 is a diagram illustrating a user terminal apparatus according to an exemplary embodiment and is a perspective view illustrating an example in which a plurality of sound output holes are disposed at a left upper part and a right upper part of the user terminal apparatus, respectively.
Figure 12:
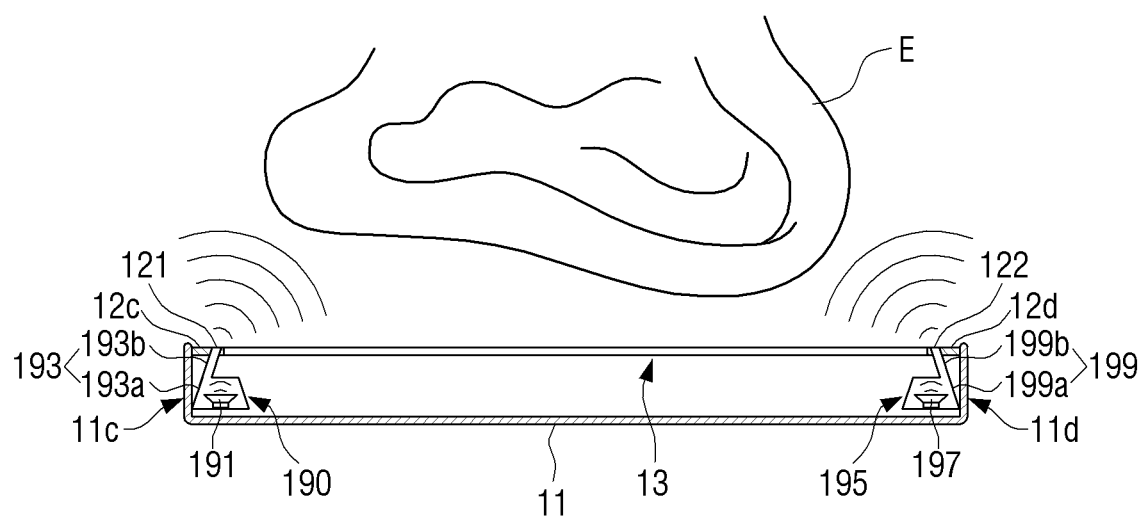
FIG. 12 is a cross-sectional view taken along the line X-X illustrated in FIG. 11.

FIG. 11 is a diagram illustrating a user terminal apparatus 10 according to an exemplary embodiment and is a perspective view illustrating an example in which a plurality of sound output holes 121 and 122 are disposed at a left upper part and a right upper part of the user terminal apparatus 10a, respectively. FIG. 12 is a cross-sectional view taken along the line X-X illustrated in FIG. 11.

FIGS. 11 and 12 illustrate a user terminal apparatus 10a according to an exemplary embodiment. The user terminal apparatus 10a according to the exemplary embodiment is substantially the same as the user terminal apparatus 10 according to the foregoing exemplary embodiment, but the number and positions of sound output holes 121 and 122 and receiver modules 190 and 195 are different from the previous exemplary embodiment.

Therefore, the same components of the user terminal apparatus 10a according to the exemplary embodiment as the user terminal apparatus 10 according to the first exemplary embodiment are denoted by the same reference numeral as the user terminal apparatus 10 and therefore the detailed description thereof will be omitted.

Referring to FIGS. 11 and 12, the user terminal apparatus 10a according to the exemplary embodiment includes the first and second sound output holes 121 and 122. The first sound output hole 121 is formed at the left part 12c of the bezel but may be adjacently disposed to the left of the flexible display 13 and the second sound output hole 122 is formed at the right part 12d of the bezel but may be adjacently disposed to the right of the flexible display 13.

In the exemplary embodiment, the position of the first and second sound output holes 121 and 122 is not limited to the described position, and therefore the first sound output hole 121 may also be formed at the boundary between the left part 11c of the housing and the left part 12c of the bezel and the second sound output hole 122 may also be formed at the boundary between the right part 11d of the housing and the right part 12d of the bezel. Further, the first sound output hole 121 may also be formed only at a portion of the left part 11c of the housing and the second sound output hole 122 may also be formed only at a portion of the right part 11d of the housing.

As described above, the first and second sound output holes 121 and 122 may be disposed to transfer the call sound toward the user's ear E.

In the exemplary embodiment, the first and second sound output holes 121 and 122 may be disposed to be symmetrical to each other based on the virtual vertical central line V of the flexible display 13.

Further, the first and second sound output holes 121 and 122 may be adjacently disposed to the upper part 11a of the user terminal apparatus 10a. The first and second sound output holes 121 and 122 are positioned at both sides of the user's ear E during a call in consideration of the sound balance.

FIG. 11 does not illustrate the proximity sensor hole 23a, the camera hole 25a, and the light sensor 27a.

Referring to FIG. 12, the first and second receiver modules 190 and 195 each are adjacently disposed to the first and second sound output holes 121 and 122 inside the user terminal apparatus 10a.

The first receiver module 190 is adjacently disposed to the back surface of the left part 12c of the bezel and includes the receiver 191 and the sound guide 193. In the exemplary embodiment, one end portion (i.e., a first end portion) 193a of the sound guide 193 encloses the receiver 191 and the other end portion (i.e., a second end portion) 193b of the sound guide 193 is connected to the first sound output hole 121.

The other end portion (i.e., the second end portion) 193b of the sound guide 193 extends toward the front surface of the user terminal apparatus 10a but is disposed to be inclined at a predetermined angle toward the center of the user terminal apparatus 10a. Therefore, the sound output from the other end 193b of the sound guide 193 may be transferred toward the user's ear E during a call.

The second receiver module 195 is adjacently disposed to the back surface of the right part 12d of the bezel and includes the receiver 197 and the sound guide 199, like the first receiver module 190. In the exemplary embodiment, one end portion (i.e., a first end portion) 199a of the sound guide 199 encloses the receiver 197 and the other end portion (i.e., a second end portion) 199b of the sound guide 199 is connected to the second sound output hole 122.

The other end portion (i.e., the second end portion) 199b of the sound guide 199 extends toward the front surface of the user terminal apparatus 10a but is disposed to be inclined at a predetermined angle toward the center of the user terminal apparatus 10a, like the first receiver module 190. Therefore, the sound output from the other end 199b of the sound guide 199 may be transferred toward the user's ear E during a call.

The first and second receiver modules 190 and 195 may be used for a call and may output the sound of the multimedia contents such as music, moving pictures, and game, instead of the speaker module 14. As such, when the first and second receiver modules 190 and 195 is not used for a call, the controller 15 may output the sound of the multimedia contents through the first and second receiver modules 190 and 195 using an audio gain control.

Further, the receiver modules included in the user terminal apparatuses 200, 200a, 200b, and 200c according to various exemplary embodiments as described below may also be used for a call and may output the sound of the multimedia contents such as music, moving pictures, and game, instead of the speaker module 14.

Meanwhile, in the case of the user terminal apparatuses 10 and 10a according to the foregoing exemplary embodiments, the lower part 12b of the bezel has an area wider than that of the upper part 12a of the bezel. Therefore, the camera hole 25a and the light sensor hole 27a may be positioned at the lower part 12b of the bezel. In the exemplary embodiment, the camera module 25 and the light sensor 27 may also be disposed at an adjacent position to the lower part 12b of the bezel within the user terminal apparatuses 10 and 10a.

Figure 13:
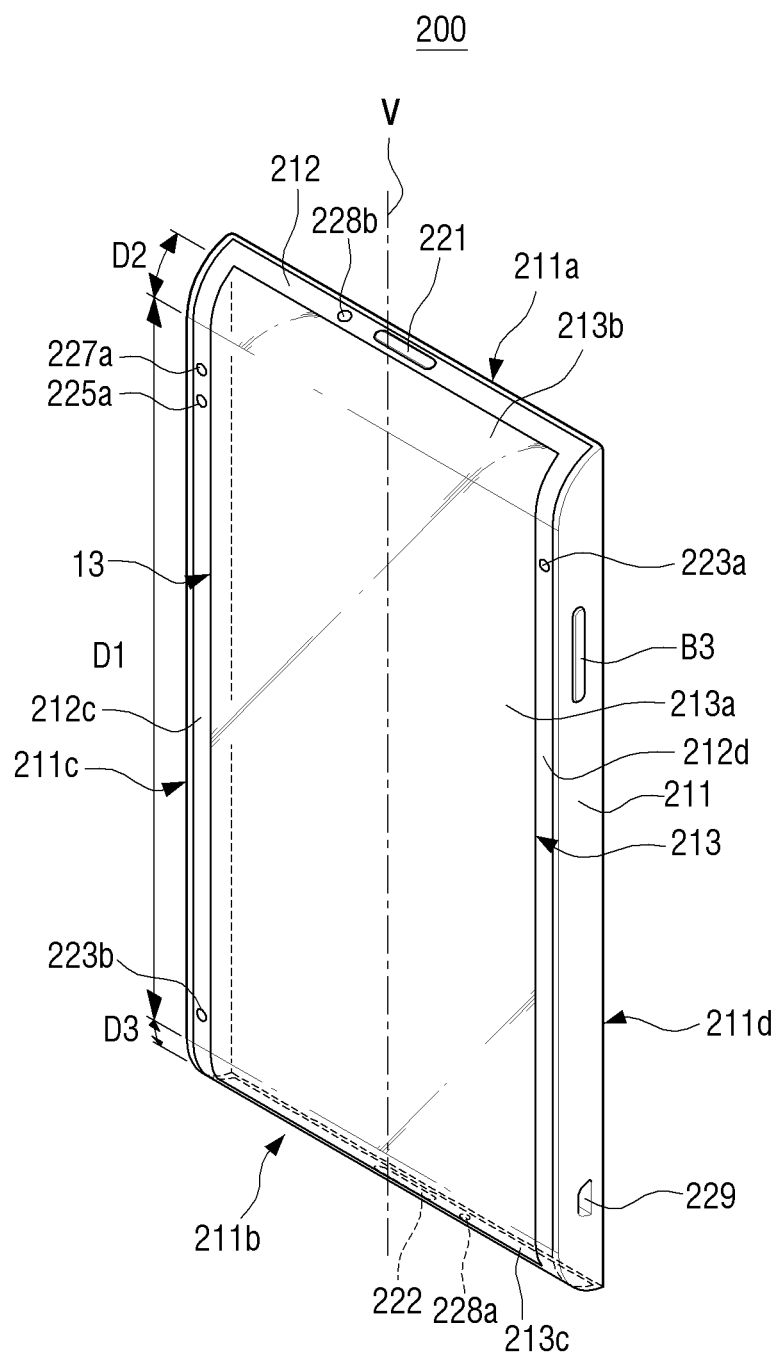
FIG. 13 is a diagram illustrating a user terminal apparatus according to an exemplary embodiment and is a perspective view illustrating an example in which a plurality of sound output holes are disposed at an upper part and a lower part of the user terminal apparatus, respectively.
Figure 14:
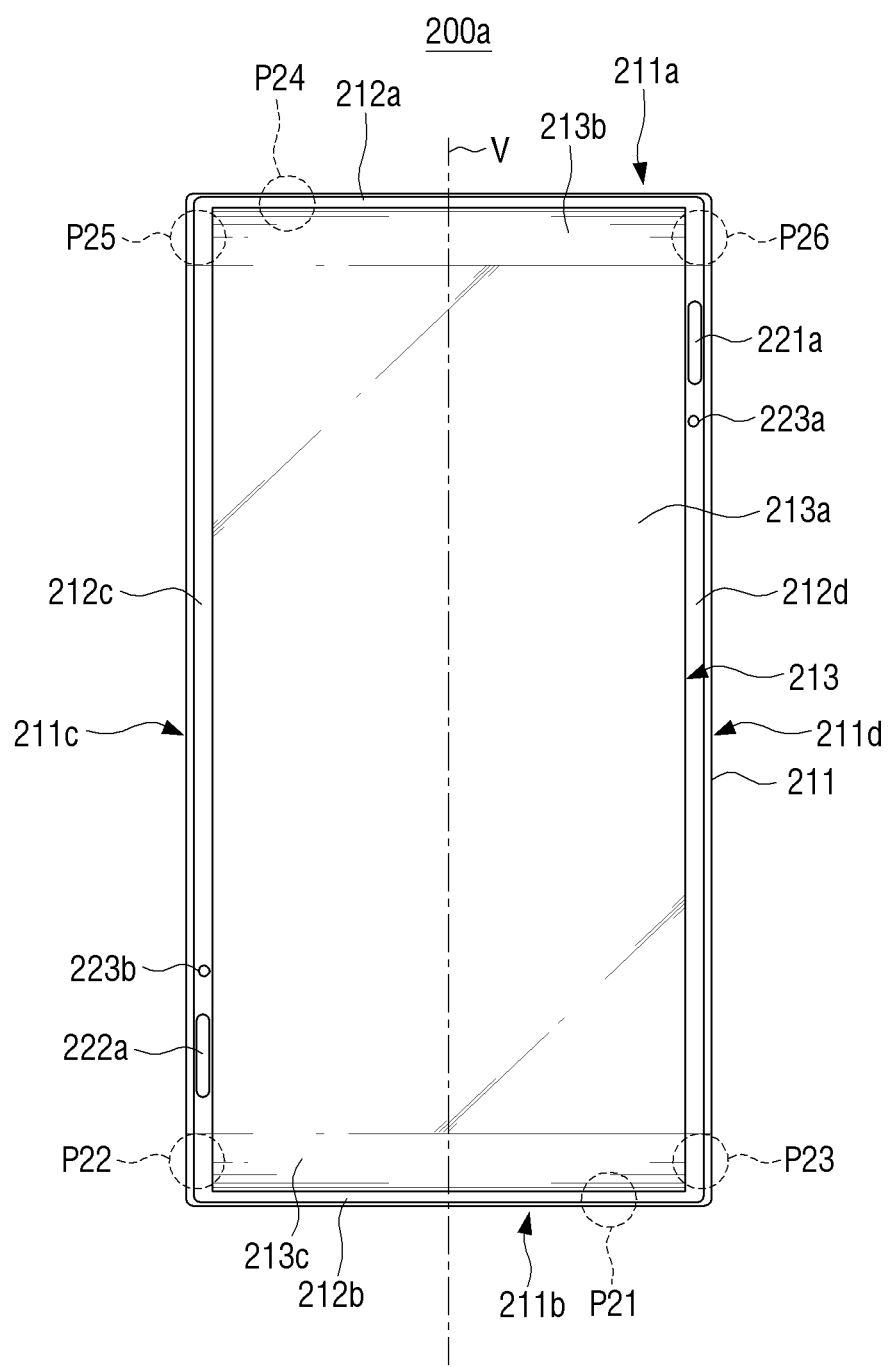
FIG. 14 is a diagram illustrating a user terminal apparatus according to an exemplary embodiment and is a front view illustrating an example in which a plurality of sound output holes are disposed at a lower left part and a upper right part of the user terminal apparatus in a mutual diagonal direction.
Figure 15:
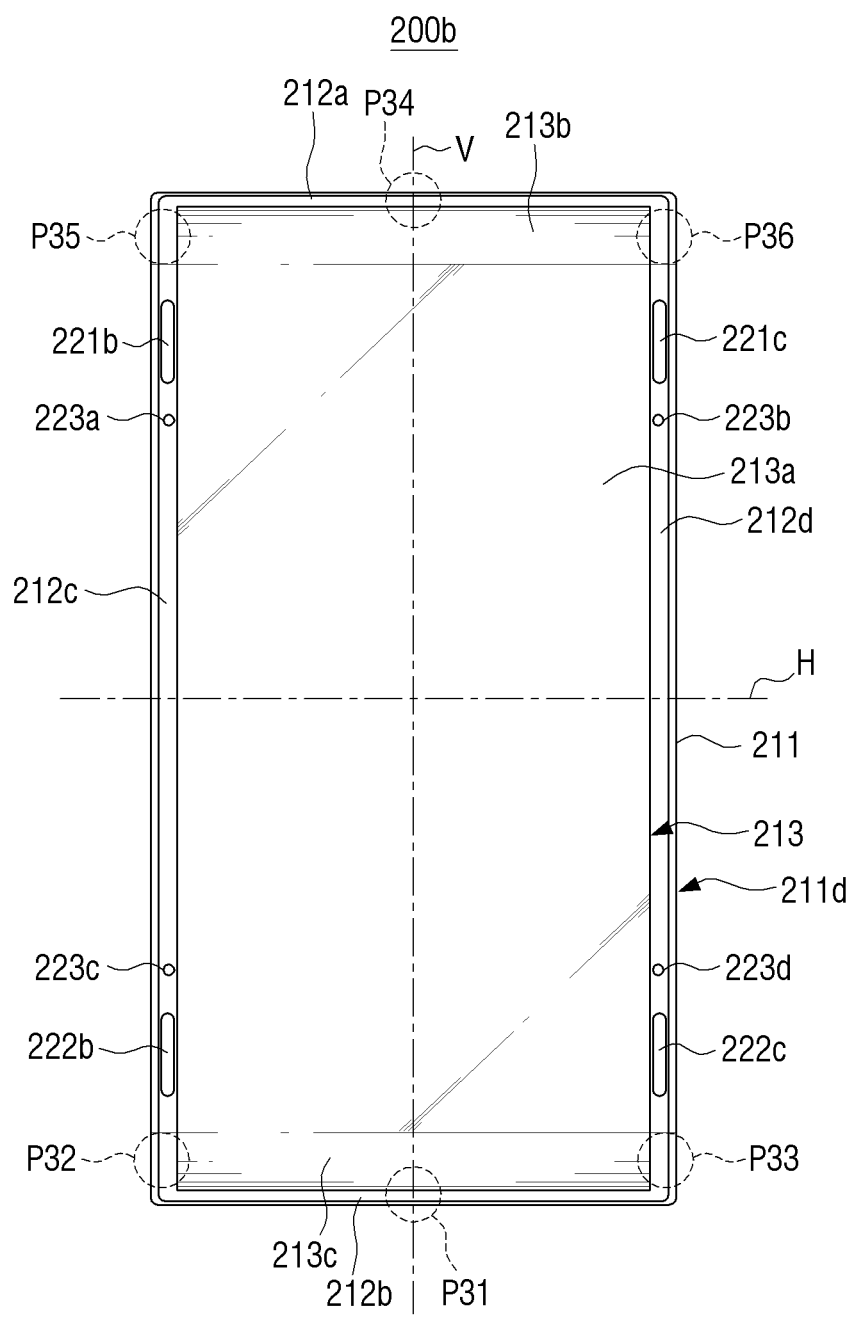
FIG. 15 is a diagram illustrating a user terminal apparatus according to an exemplary embodiment and is a front view illustrating an example in which a plurality of sound output holes are symmetrically disposed at a left part and a right part of the user terminal apparatus, respectively.
Figure 16:
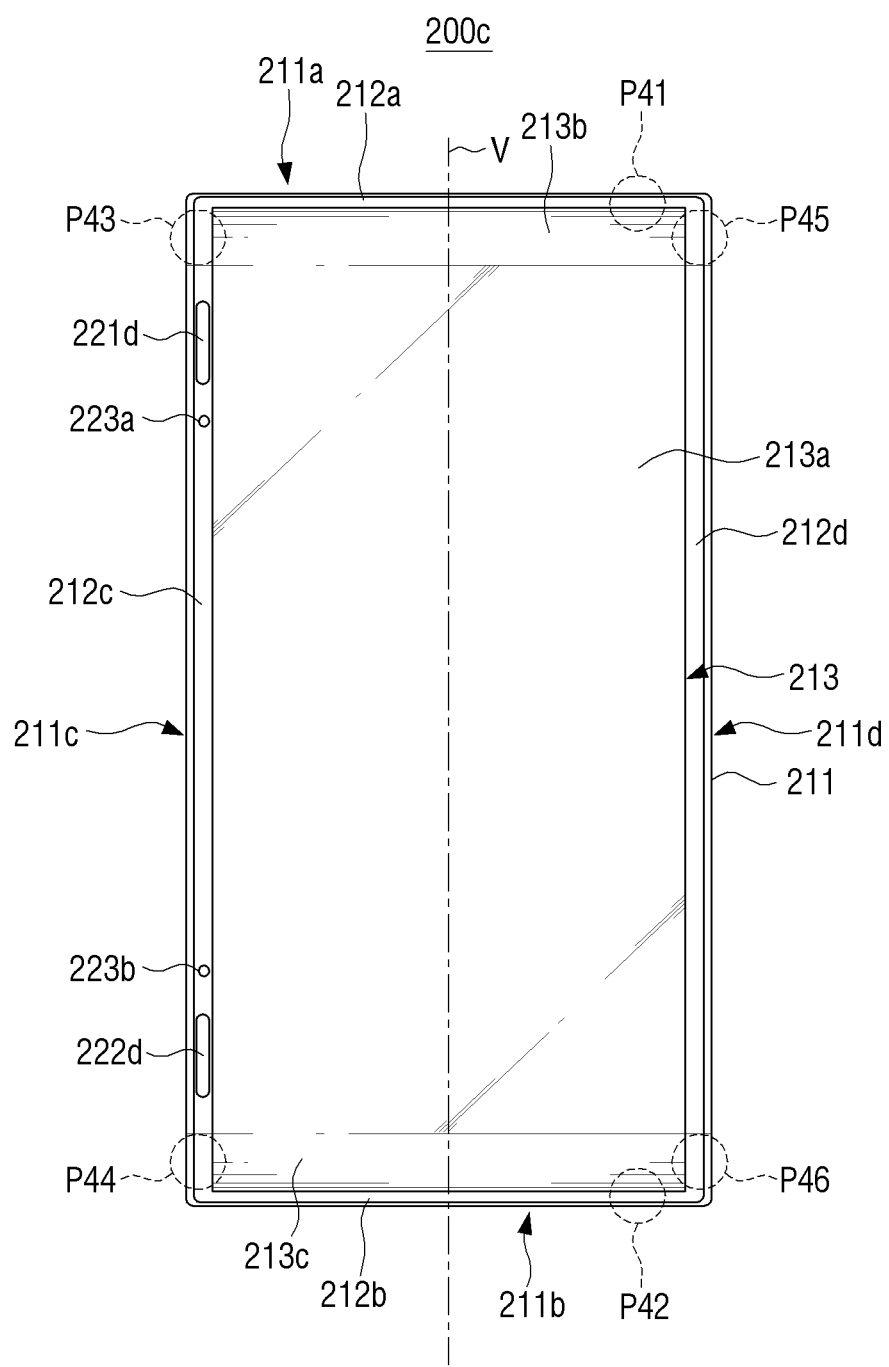
FIG. 16 is a diagram illustrating a user terminal apparatus according to an exemplary embodiment and is a front view illustrating an example in which a plurality of sound output holes are disposed at upper and lower parts of a left part of the user terminal apparatus, respectively.

Hereinafter, the user terminal apparatuses 200, 200a, 200b, and 200c according to various exemplary embodiments will be sequentially described with reference to FIGS. 13 to 16. FIG. 13 is a diagram illustrating a user terminal apparatus 200 according to an exemplary embodiment and is a perspective view illustrating an example in which a plurality of sound output holes 221 and 222 are disposed at an upper part and a lower part of the user terminal apparatus 200, respectively. FIG. 14 is a diagram illustrating a user terminal apparatus 200a according to an exemplary embodiment and is a front view illustrating an example in which a plurality of sound output holes 221a and 222a are disposed at a lower left part and a upper right part of the user terminal apparatus 200a in a mutual diagonal direction. FIG. 15 is a diagram illustrating a user terminal apparatus 200b according to an exemplary embodiment and is a front view illustrating an example in which a plurality of sound output holes 221b, 221c, 222b and 222c are symmetrically disposed at a left part and a right part of the user terminal apparatus 200b, respectively. FIG. 16 is a diagram illustrating a user terminal apparatus 200c according to an exemplary embodiment and is a front view illustrating an example in which a plurality of sound output holes 221d and 222d are disposed at upper and lower parts of a left part of the user terminal apparatus 200c, respectively.

Unlike the previous exemplary embodiments as described with respect to FIG. 1, the user terminal apparatuses 200, 200a, 200b, and 200c according to the exemplary embodiments shown in FIGS. 13-16 are examples in which each of the upper and lower parts of the user terminal apparatuses 200, 200a, 200b, and 200c has a curved portion (first and second sub areas 213b and 213c, respectively).

Referring to FIG. 13, the user terminal apparatus 200 according to an exemplary embodiment includes a housing 211 in which various components in addition to the controller illustrated in FIG. 1 are embedded and a flexible display 213 which displays a predetermined image and receives a user command. In the exemplary embodiment, the flexible display 213 includes a main area 213a which is disposed on the front surface of the user terminal apparatus 200, the first sub area 213b which extends towards the upper part 211a of the housing 211 from the main area 213a to be curved with a predetermined curvature, and the second sub area 213c which extends toward the lower part 211b of the housing 211 from the main area 213a to be curved with a predetermined curvature. The main area 213a is denoted as a section D1 which is formed in a plane from a lower part 211b to an upper part 211a of the user terminal apparatus 200 and the first and second sub areas 213b and 213c are denoted as sections D2 and D3 each of which vertically extend to respective ends of the main area 213a from the lower part 211b and the upper part 211a of the user terminal apparatus 200 to be formed in a curved surface.

The first sound output hole 221 may be formed at the boundary at which the upper part 211a of the housing 211 and the upper part 212a of the bezel 212 contact each other and the second sound output hole 222 may be formed at the boundary at which the lower part 211b of the housing 211 and the lower part 212b of the bezel 212 contact each other.

In the exemplary embodiment, the respective position of the first and second sound output holes 221 and 222 is not limited to the foregoing position and the first sound output hole 221 may be formed only at a portion of the upper part 211a of the housing or only at a portion of the upper part 212a of the bezel 212 and the second sound output hole 222 may be formed only at a portion of the lower part 211b of the housing or only at a portion of the lower part 212b of the bezel 212.

In addition, the first sound input hole 228a forming a pair with the first sound output hole 221 may be formed at the lower part 212b of the bezel 212 and the second sound input hole 228b forming a pair with the second sound output hole 222 may be formed at the upper part 212a of the bezel 212.

As such, when the first and second sub areas are each disposed on the upper/lower surfaces of the user terminal apparatus 200, the first sound output hole 221 may be formed at the upper part 212a of the bezel 212 and the second sound output hole 222 may be formed at the lower part 212b of the bezel 212.

As the upper and lower parts of the user terminal apparatus 200 are each provided with the first and second sound output holes 221 and 222 and the first and second sound input holes 228a and 228b, the user may conveniently speak without dividing the upper and lower parts of the user terminal apparatus 200. That is, the user is not required to rotate the phone to place user's ear on one end of the user terminal apparatus 200.

The first and second sound output holes 221 and 222 may be disposed at a position to intersect the virtual vertical central line V of the flexible display 13 as shown in FIG. 13.

However, the respective locations of the first and second sound output holes 221 and 222 are not limited thereto and may be disposed at a position which is offset by a predetermined distance from the virtual vertical central line V. That is, both of the first and second sound output holes 221 and 222 may be disposed to be offset towards the left part 211c of the housing 211 with respect to the virtual vertical central line V or disposed to be offset towards the right part 211d of the housing 211. Further, the first and second sound output holes 221 and 222 may also be disposed to be offset by a predetermined distance in the opposite direction to each other with respect to the virtual vertical central line V.

As such, when the first and second sound output holes 221 and 222 are variously disposed, the camera hole 225a and the light sensor hole 227a may be disposed at a proper position within the user terminal apparatus 200 in consideration of the position of the first and second sound output holes 221 and 222.

The first sound input hole 228a may be adjacently disposed to the second sound output hole 222 and the second sound input hole 228b may be adjacently disposed to the first sound output hole 221 in the exemplary embodiment. However, the exemplary embodiment is not limited thereto and the first sound input hole 228a and the second sound input hole 228b may be provided according to the design intent.

The first proximity sensor hole 223a is formed at the right part 212d of the bezel 212 and the second proximity sensor hole 223b is formed at the left part 212c of the bezel 212. The first and second proximity sensor (not illustrated) which correspond to the first and second proximity sensor holes 223a and 223b, respectively, are provided inside the user terminal apparatus 200.

According to the user terminal apparatus 200 according to the exemplary embodiment configured as described above and shown in FIG. 13, when the first receiver (not illustrated) corresponding to the first sound output hole 221 and the first microphone module (not illustrated) corresponding to the first sound input hole 228a are used during a call, the second microphone module (not illustrated) corresponding to the second sound input hole 228b may be controlled to perform a noise canceling function by the controller 15 and the second receiver (not illustrated) which outputs a sound to the second sound output hole 222 may be turned off by the controller 15. Similarly, when the second receiver corresponding to the second sound output hole 222 and the second microphone module corresponding to the second sound input hole 228b are used during a call, the first microphone module may be controlled to perform the noise cancelling function by the controller 15 and the first receiver may be turned off by the controller 15.

The controller 15 may determine the posture of the user terminal apparatus 200 lifted by the user during a call based on the detection signals of the first and second proximity sensors (not illustrated). Further, the detection may also be made using various sensors S (see FIG. 1).

In FIG. 13, reference numeral B3 represents a physical key button which turns on/off the flexible display 213 or which turns on/off a power supply and reference numeral 229 represents a charging terminal.

Referring to FIG. 14, most of the components of the user terminal apparatus 200a according to the exemplary embodiment of FIG. 14 are the same as those of the user terminal apparatus 200 according to the exemplary embodiment shown in FIG. 13, but the positions of the sound output holes 221a and 222a are differently placed in FIG. 14. Therefore, the user terminal apparatus 200a according to the exemplary embodiment will be described based on the positions of the first and second sound output holes 221a and 222a.

In the user terminal apparatus 200a according to the exemplary embodiment, the first sound output hole 221a is formed at the right part 212d of the bezel 212 and the second sound output hole 222a is formed at the left part 212c of the bezel 212. In the exemplary embodiment, the first sound output hole 221a may be adjacently disposed at the upper part 211a of the housing 211 and the second sound output hole 222a may be adjacently disposed at the lower part 211b of the housing 211.

Meanwhile, the position of the first and second sound output holes 221a and 222a is not limited to the foregoing position, and therefore the first sound output hole 221a may also be formed at the boundary at which the right part 211d of the housing 211 and the right part 212d of the bezel 212 contact each other and the second sound output hole 222a may also be formed at the boundary at which the left part 211c of the housing 211 and the left part 212c of the bezel 212 contact each other. Further, the first sound output hole 221a may also be formed only at a portion of the right part 211d of the housing 211 and the second sound output hole 222a may also be formed only at a portion of the left part 211c of the housing 211.

The first and second sound output holes 221a and 222a may be disposed in approximately a diagonal direction with respect to the virtual vertical central line V of the flexible display 213. In the exemplary embodiment, the first proximity sensor hole 223a may be adjacently disposed to the first sound output hole 221a and the second proximity sensor hole 223b may be adjacently disposed to the second sound output hole 222a.

In addition, the first sound input hole (not illustrated) forming a pair with the first sound output hole 221a may be disposed at a predetermined position P21 of the lower part 211b of the housing 211 or each of the predetermined positions P22 and P23 of the left part 211c and the right part 211d of the housing 211. The predetermined position P21 may be adjacently disposed at the right part 211d of the housing 211 and the predetermined positions P22 and P23 each may be adjacently disposed at the lower part 211b of the housing 211.

Further, the second sound input hole (not illustrated) forming a pair with the second sound output hole 222a may be disposed at a predetermined position P24 of the upper part 211a of the housing 211 or each of the predetermined positions P25 and P26 of the left part 211c and the right part 211d of the housing 211. The predetermined position P24 may be adjacently disposed to the left part 211c of the housing 211 and the predetermined positions P25 and P26 each may be adjacently disposed to the upper part 211a of the housing 211.

Referring to FIG. 15, most of the components of the user terminal apparatus 200b according to the exemplary embodiment of FIG. 15 are the same as those of the user terminal apparatus 200 as shown in FIG. 13, but the positions of first, second, third, and fourth sound output holes 221b, 221c, 222b and 222c are disposed differently. Therefore, the user terminal apparatus 200b according to the exemplary embodiment of FIG. 15 will be described based on the positions of the first, second, third and fourth sound output holes 221b, 221c, 222b, and 222c.

In the user terminal apparatus 200b according to the exemplary embodiment, the first and second sound output holes 221b and 221c form a pair and the third and fourth sound output holes 222b and 222c form another pair. Therefore, the first and second receivers (not illustrated) corresponding to the first and second sound output holes 221b and 221c are operated together and the third and fourth receivers (not illustrated) corresponding to the third and fourth sound output holes 222b and 222c are operated together.

The first sound output hole 221b is formed at the left part 212c of the bezel 212 and the second sound output hole 221c is formed at the right part 212d of the bezel 212. The third sound output hole 222b is formed at the left part 212c of the bezel 212 and the fourth sound output hole 222c is formed at the right part 212d of the bezel 212. In the exemplary embodiment, the first and second sound output holes 221b and 221c may be disposed at the upper part 211a of the housing 211 and the third and fourth sound output holes 222b and 222c may be disposed at the lower part 211b of the housing 211.

In addition, the position of the first, second, third and fourth sound output holes 221b, 221c, 222b, and 222c is not limited to the foregoing position, and therefore the first and third sound output holes 221b and 222b may also be formed at the boundary at which the left part 211c of the housing 211 and the left part 212c of the bezel 212 contact each other and the second and fourth sound output holes 221c and 222c may also be formed at the boundary at which the right part 211d of the housing 211 and the right part 212d of the bezel 212 contact each other. Further, the first and third sound output holes 221b and 222b may also be formed only at a portion of the left part 211c of the housing 211 and the second and fourth sound output holes 221c and 222c may also be formed only at a portion of the right part 211d of the housing 211.

Further, the first and second sound output holes 221b and 221c may be disposed to be symmetrical to each other based on the virtual vertical central line V of the flexible display 213 and the third and fourth sound output holes 222b and 222c may also be disposed to be symmetrical to each other based on the virtual vertical central line V. Further, the first and third sound output holes 221b and 222b may be disposed to be symmetrical to each other based on a virtual horizontal central line H of the flexible display 213 and the second and fourth sound output holes 221c and 222c may also be disposed to be symmetrical to each other based on the virtual horizontal central line H.

As the first, second, third and fourth sound output holes 221b, 221c, 222b, and 222c are disposed to be symmetrical to each other based on the vertical and horizontal central lines V and H, the sounds output from each of the first, second, third and fourth sound output holes 221b, 221c, 222b, and 222c may be transferred to the user's ear E while keeping a balance during a call.

In the exemplary embodiment, the first and second proximity sensor holes 223a and 223b each may be adjacently disposed to the first and second sound output holes 221b and 221c, respectively and the third and fourth proximity sensor holes 223c and 223b each may be adjacently disposed to the third and fourth sound output holes 222b and 222c, respectively.

In addition, the first sound input hole (not illustrated) forming a pair with the first and second sound output holes 221b and 221c may be disposed at a predetermined position P31 of the lower part 211b of the housing 211 or each of the predetermined positions P32 and P33 of the left part 211c and the right part 211d of the housing 211. The predetermined position P31 may be a position intersecting the virtual vertical central line V, that is, a position corresponding to the center of the lower part 211b of the housing 211. Further, when the first sound input hole is disposed at the left part 211c and the right part 211d of the housing 211, the first sound input hole may be adjacently disposed to the lower part 211b of the housing 211.

Further, the second sound input hole (not illustrated) forming a pair with the third and fourth sound output holes 222b and 222c may be disposed at a predetermined position P34 of the upper part 211a of the housing 211 or each of the predetermined positions P35 and P36 of the left part 211c and the right part 211d of the housing 211. The predetermined position P34 may be a position intersecting the virtual vertical central line V, that is, a position corresponding to the center of the upper part 211a of the housing. Further, when the second sound input hole is disposed at the left part 211c and the right part 211d of the housing 211, the second sound input hole may be adjacently disposed to the upper part 211a of the housing 211.

Referring to FIG. 16, most of the components of a user terminal apparatus 200c according to the exemplary embodiment of the figure are the same as those of the user terminal apparatus 200 according to the exemplary embodiment of FIG. 13, but the positions of first and second sound output holes 221d and 222d are differently disposed. Therefore, the user terminal apparatus 200c according to the exemplary embodiment will be described based on the positions of the first and second sound output holes 221d and 222d.

In the user terminal apparatus 200c according to the exemplary embodiment, both of the first and second sound output holes 221d and 222d are formed at the left part 212c of the bezel 212. In the exemplary embodiment, the first sound output hole 221d may be adjacently disposed at the upper part 211a of the housing 211 and the second sound output hole 222d may be adjacently disposed at the lower part 211b of the housing 211.

However, the positions of the first and second sound output holes 221d and 222d are not limited to the foregoing positions and both thereof may also be, for example, formed at the right part 212d of the bezel 212. Further, both of the first and second sound output holes 221d and 222d may be formed at the boundary at which the left part 211c of the housing 211 and the left part 212c of the bezel 212 contact each other or may also be formed at the boundary at which the right part 211d of the housing 211 and the right part 212d of the bezel 212 contact each other. Further, the first and second sound output holes 221 and 222d may also be formed only at a portion of the left part 211c of the housing 211 or a portion of the right part 211d of the housing 211.

The first proximity sensor hole 223a may be adjacently disposed to the first sound output hole 221d and the second proximity sensor hole 223b may be adjacently disposed to the second sound output hole 222d.

Meanwhile, the first sound input hole (not illustrated) forming a pair with the first sound output hole 221d may be disposed at a predetermined position P42 of the lower part 211b of the housing 211 or each of the predetermined positions P44 and P46 of the left part 211c and the right part 211d of the housing 211. The predetermined position P42 may be adjacently disposed to the right part 211d of the housing 211 and the predetermined positions P44 and P46 each may be adjacently disposed to the lower part 211b of the housing 211.

Further, the second sound input hole (not illustrated) forming a pair with the second sound output hole 222d may be disposed at a predetermined position P41 of the upper part 211a of the housing 211 or each of the predetermined positions P43 and P45 of the left part 211c and the right 211d of the housing 211. The predetermined position P41 may be adjacently disposed to the right part 211d of the housing 211 and the predetermined positions P43 and P45 each may be adjacently disposed to the upper part 211a of the housing 211. In the user terminal apparatuses 200, 200a, 200b, and 200c according to the foregoing exemplary embodiments, a plurality of soft keys (not illustrated) may be disposed in any one of the first and second sub areas 213b and 213c of the flexible display 213.

As described above, the user terminal apparatuses 10 and 10a according to the exemplary embodiments of FIGS. 2A and 11 relate to an example in which the positions of the sound output hole, the sound input hole, and the proximity sensors when the upper surfaces of the user terminal apparatuses 10 and 10a are formed by the flexible display 13, are limited and the user terminal apparatuses 200, 200a, 200b, and 200c according to the exemplary embodiments of FIGS. 13-16 relate to an example in which the positions of the sound output hole, the sound input hole, and the proximity sensors when the upper and lower surfaces of the user terminal apparatuses 200, 200a, 200b, and 200c are simultaneously formed by the flexible display 213 are limited.

In the user terminal apparatus including the flexible display according to the exemplary embodiment, the positions of the sound output hole, the sound input hole, and the proximity sensors may be differently arranged.

Further, the virtual vertical central line V and the virtual horizontal central line H of the foregoing flexible displays 13 and 213 may be substituted into the virtual vertical central line (not illustrated) and the virtual horizontal central line (not illustrated) of the user terminal apparatus 10.

While exemplary embodiments have been particularly shown and described hereinabove, it would be appreciated by those skilled in the art that various changes may be made therein without departing from the scope and spirit of the inventive concept as defined by the following claims.

What is claimed is:

1. An electronic apparatus, comprising:
    a display provided on a first side of the electronic apparatus and including an upper portion and a bottom portion being curved, respectively;
    a bezel surrounding the display;
    a first sound output hole disposed to a left part of the bezel or a right part of the bezel adjacent to the upper portion of the display;
    a second sound output hole disposed to a left part of the bezel or a right part of the bezel adjacent to the bottom portion of the display;
    a first receiver module adjacent to the first sound output hole in the electronic apparatus;
    a second receiver module adjacent to the second sound output hole in the electronic apparatus;
    a first sound input hole disposed to the bezel adjacent to the bottom portion of the display; and
    a second sound input hole disposed to the bezel adjacent to the upper portion of the display.

2. The electronic apparatus as claimed in claim 1, wherein the first sound input hole is disposed to one of the left part, the right part and a bottom part of the bezel adjacent to the bottom portion of the display; and
    wherein the second sound input hole disposed to one of the left part, the right part and a bottom part of the bezel adjacent to the upper portion of the display.

3. The electronic apparatus as claimed in claim 1, further comprising
    a first microphone module adjacent to the first sound input hole in the electronic apparatus; and
    a second microphone module adjacent to the second sound input hole in the electronic apparatus.

4. The electronic apparatus as claimed in claim 1, further comprising a first proximity sensor provided adjacent to the first sound output hole; and a second proximity sensor provided adjacent to the second sound output hole.

5. The electronic apparatus as claimed in claim 1, wherein the second sound output hole is opposite to the first sound output hole.

6. The electronic apparatus as claimed in claim 1, wherein the second sound output hole is disposed in a same part of the bezel in which the first sound output hole is disposed.

7. The electronic apparatus as claimed in claim 1, further comprising a third sound output hole disposed in a part of the left part or the right part of the bezel adjacent to the bottom portion of the display in which the first sound output hole is disposed; and a fourth sound output hole disposed in a part of the left part or the right part of the bezel adjacent to the upper portion of the display in which the second sound output hole is disposed.

8. The electronic apparatus as claimed in claim 7, wherein a third sound input hole is disposed to one of a left part, a right part and a bottom part of the bezel adjacent to the upper portion of the display; and wherein a fourth sound input hole disposed to one of a left part, a right part and a bottom part of the bezel adjacent to the bottom portion of the display.

9. The electronic apparatus as claimed in claim 8, further comprising a third microphone module adjacent to the third sound input hole in the electronic apparatus; and a fourth microphone module adjacent to the fourth sound input hole in the electronic apparatus.

10. The electronic apparatus as claimed in claim 7, further comprising a third receiver module adjacent to the third sound output hole in the electronic apparatus; and a fourth receiver module adjacent to the fourth sound output hole in the electronic apparatus.

11. The electronic apparatus as claimed in claim 7, further comprising a third proximity sensor provided adjacent to the third sound output hole; and a fourth proximity sensor provided adjacent to the fourth sound output hole.

\* \* \* \* \*